(12) United States Patent
Horiuchi

(10) Patent No.: US 11,033,915 B2
(45) Date of Patent: Jun. 15, 2021

(54) AIR TURBINE DRIVE SPINDLE

(71) Applicant: NTN Corporation, Osaka (JP)

(72) Inventor: Teruyoshi Horiuchi, Iwata (JP)

(73) Assignee: NTN CORPORATION, Osaka (JP)

( * ) Notice: Subject to any disclaimer, the term of this patent is extended or adjusted under 35 U.S.C. 154(b) by 338 days.

(21) Appl. No.: 16/319,618

(22) PCT Filed: Jul. 7, 2017

(86) PCT No.: PCT/JP2017/024909
§ 371 (c)(1),
(2) Date: Jan. 22, 2019

(87) PCT Pub. No.: WO2018/025579
PCT Pub. Date: Feb. 8, 2018

(65) Prior Publication Data
US 2020/0398291 A1    Dec. 24, 2020

(30) Foreign Application Priority Data

Aug. 4, 2016  (JP) .............................. JP2016-153966

(51) Int. Cl.
*B05B 5/04* (2006.01)
*F16C 32/06* (2006.01)
(Continued)

(52) U.S. Cl.
CPC ........ *B05B 5/0415* (2013.01); *F16C 32/0603* (2013.01); *F01D 25/164* (2013.01);
(Continued)

(58) Field of Classification Search
CPC .............. F16C 32/0603; F16C 32/0607; F16C 32/0611; F16C 32/0614; F16C 32/0622;
(Continued)

(56) References Cited

U.S. PATENT DOCUMENTS

| 4,153,993 A | 5/1979 | Kataoka et al. |
| 5,246,352 A | 9/1993 | Kawakami |

(Continued)

FOREIGN PATENT DOCUMENTS

| CN | 1973134 A | 5/2007 |
| CN | 101771307 A | 7/2010 |

(Continued)

OTHER PUBLICATIONS

Chinese Office Action issued in corresponding Chinese Patent Application No. 201780048897.7, dated Nov. 4, 2020, with English translation.

(Continued)

*Primary Examiner* — Alan B Waits
(74) *Attorney, Agent, or Firm* — McDermott Will & Emery LLP

(57) ABSTRACT

An air turbine drive spindle includes a rotary shaft, a bearing portion, a damper ring, a cover member, and at least one or more O rings. The bearing portion surrounds at least a portion of an outer circumferential surface of the rotary shaft. The damper ring is disposed at the outer circumferential side relative to the bearing portion with a gap being interposed therebetween. The cover member is disposed at the outer circumference side relative to the damper ring with a gap being interposed therebetween, and is configured to store the rotary shaft, the bearing portion, and the damper ring. At least one or more O rings are disposed in each of the gap and the gap.

10 Claims, 14 Drawing Sheets

(51) Int. Cl.
*F01D 25/16* (2006.01)
*F16C 27/02* (2006.01)

(52) U.S. Cl.
CPC .......... *F05D 2240/50* (2013.01); *F16C 27/02* (2013.01); *F16C 2360/23* (2013.01)

(58) Field of Classification Search
CPC ...... F16C 32/0625; F16C 17/12; F16C 17/18; F16C 27/02; F16C 27/045; F16C 35/02; F16C 39/02; F16C 2360/23; F16C 2233/00; F16C 33/74; F16F 15/165; F16J 15/32; F01D 25/164; F05D 2240/50; B05B 5/0415
See application file for complete search history.

(56) References Cited

U.S. PATENT DOCUMENTS

| | | | |
|---|---|---|---|
| 5,738,356 A * | 4/1998 | Marshall | F01D 25/186 277/313 |
| 8,162,544 B2 * | 4/2012 | Hirata | F16C 32/0685 384/100 |
| 9,970,481 B1 * | 5/2018 | van der Steur | F16C 43/02 |
| 2008/0292229 A1 | 11/2008 | Dubreuil et al. | |
| 2010/0284638 A1 | 11/2010 | Hirata | |
| 2011/0081231 A1 | 4/2011 | Hoelzer et al. | |
| 2014/0090626 A1 | 4/2014 | An et al. | |
| 2015/0056071 A1 | 2/2015 | Woollenweber | |
| 2015/0078696 A1 | 3/2015 | Schmidt | |
| 2015/0184531 A1 | 7/2015 | Baptista | |

FOREIGN PATENT DOCUMENTS

| | | |
|---|---|---|
| CN | 101809292 A | 8/2010 |
| CN | 102016325 A | 4/2011 |
| CN | 202417693 U | 9/2012 |
| CN | 103649545 A | 3/2014 |
| CN | 104220706 A | 12/2014 |
| CN | 104411922 A | 3/2015 |
| EP | 1760319 A1 | 3/2007 |
| JP | S50-085650 U | 7/1975 |
| JP | S53-92595 A | 8/1978 |
| JP | H05-071358 A | 3/1993 |
| JP | H09-000995 A | 1/1997 |
| JP | H09-072338 A | 3/1997 |
| JP | 2002-295470 A | 10/2002 |
| JP | 2006-077797 A | 3/2006 |
| JP | 2008-138850 A | 6/2008 |
| JP | 2010-261505 A | 11/2010 |
| WO | 2009/133445 A1 | 11/2009 |
| WO | 2013/079896 A1 | 6/2013 |

OTHER PUBLICATIONS

Chinese Office Action issued in corresponding Chinese Patent Application No. 201780048897.7, dated Feb. 27, 2020, with English translation.
International Search Report issued in International Patent Application No. PCT/JP2017/024909, dated Oct. 3, 2017, with English translation.

* cited by examiner

AIR TURBINE DRIVE SPINDLE

CROSS REFERENCE:

This application is the U.S. National Phase under 35 U.S.C. § 371 of International Application No. PCT/JP2017/024909 filed on Jul. 7, 2017, which claims the benefit of Japanese Application No. 2016-153966, filed on Aug. 4, 2016, the entire contents of each are hereby incorporated by reference.

TECHNICAL FIELD

The present invention relates to an air turbine drive spindle applied to a precision processing machine, an electrostatic coating apparatus, or the like.

BACKGROUND ART

Conventionally, an air turbine drive spindle used for a precision processing machine or an electrostatic coating apparatus has been known. For example, Japanese Patent Laying-Open No. 9-72338 discloses a spindle in which a bearing member configured to rotatably support a rotary shaft is held in a housing. In Japanese Patent Laying-Open No. 9-72338, the bearing member is supported to be fixed to the housing with an O ring being interposed therebetween. Such an O ring is normally constituted of an elastic body such as rubber. The O ring has a function of absorbing vibration generated by high-speed rotation of the rotary shaft of the spindle and accordingly stabilizing an operation of the spindle.

CITATION LIST

Patent Literature

PTL 1: Japanese Patent Laying-Open No. 9-72338

SUMMARY OF INVENTION

Technical Problem

Here, because the electrostatic coating apparatus or the like in which the spindle is used is used in a solvent atmosphere, a material excellent in solvent resistance needs to be used for the above-described O ring. For such a material excellent in solvent resistance, perfluoroelastomer has been known. Perfluoroelastomer is excellent in solvent resistance, but has a hardness higher than that of a rubber material generally used for an O ring. As a result, an O ring composed of perfluoroelastomer has a smaller amount of deformation with respect to external force than that of a general O ring. Accordingly, vibration resulting from the rotation of the rotary shaft cannot be sufficiently absorbed by the O ring, with the result that the rotary shaft of the spindle may be unable to be rotated at a high speed stably.

Moreover, the material of the O ring is not limited to perfluoroelastomer, and it is considered to appropriately select a material for the O ring in accordance with a utilization condition of the spindle. In such a case, the spindle is required to achieve stable and high speed rotation of a rotary shaft by sufficiently absorbing vibration resulting from the rotation of the rotary shaft even when an O ring composed of a material having a hardness higher than that of the material of the general O ring is used in order to increase a degree of freedom in selecting a material.

The present invention has been made to solve the foregoing problem, and has an object to provide an air turbine drive spindle, by which a rotary shaft can be stably rotated at a high speed.

Solution to Problem

An air turbine drive spindle according to the present invention includes a rotary shaft, a bearing portion, a support member, a cover member, and at least one or more O rings. The bearing portion is configured to surround at least a portion of an outer circumferential surface of the rotary shaft. The support member is disposed at an outer circumferential side relative to the bearing portion with a first gap being interposed between the support member and the bearing portion. The cover member is disposed at the outer circumferential side relative to the support member with a second gap being interposed between the cover member and the support member, and is configured to store the rotary shaft, the bearing portion, and the support member. At least one or more O rings are disposed in each of the first gap and the second gap.

Advantageous Effects of Invention

According to the present invention, there can be obtained an air turbine drive spindle, by which a rotary shaft can be stably rotated at a high speed.

DESCRIPTION OF EMBODIMENTS

Figure 1:
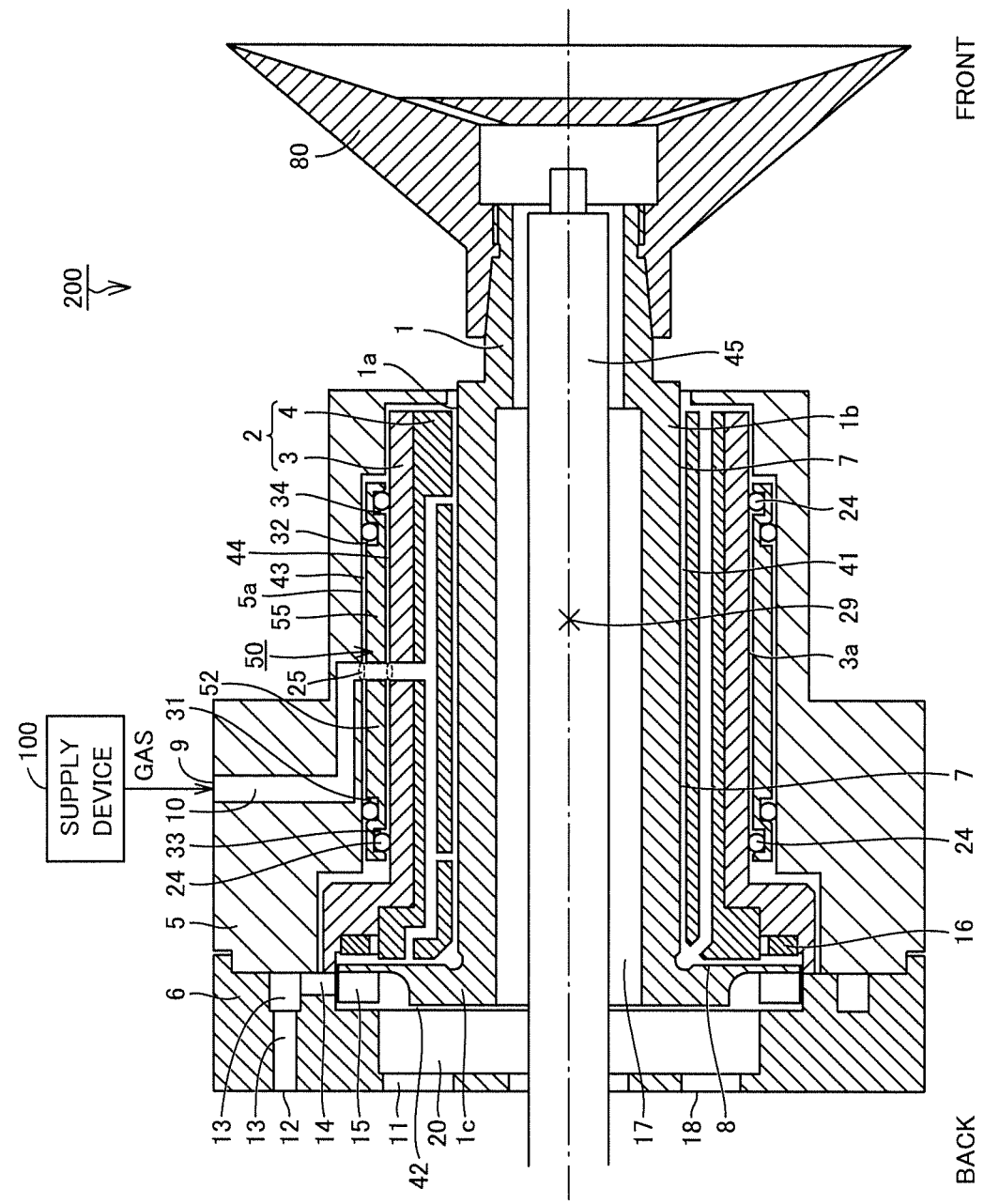
FIG. 1 is a schematic cross sectional view of an air turbine drive spindle according to the present embodiment.

The following describes an embodiment of the present invention with reference to figures. It should be noted that in the below-described figures, the same or corresponding portions are given the same reference characters and are not described repeatedly.

Embodiments of the Present Application

<Configuration of Air Turbine Drive Spindle>

Figure 2:
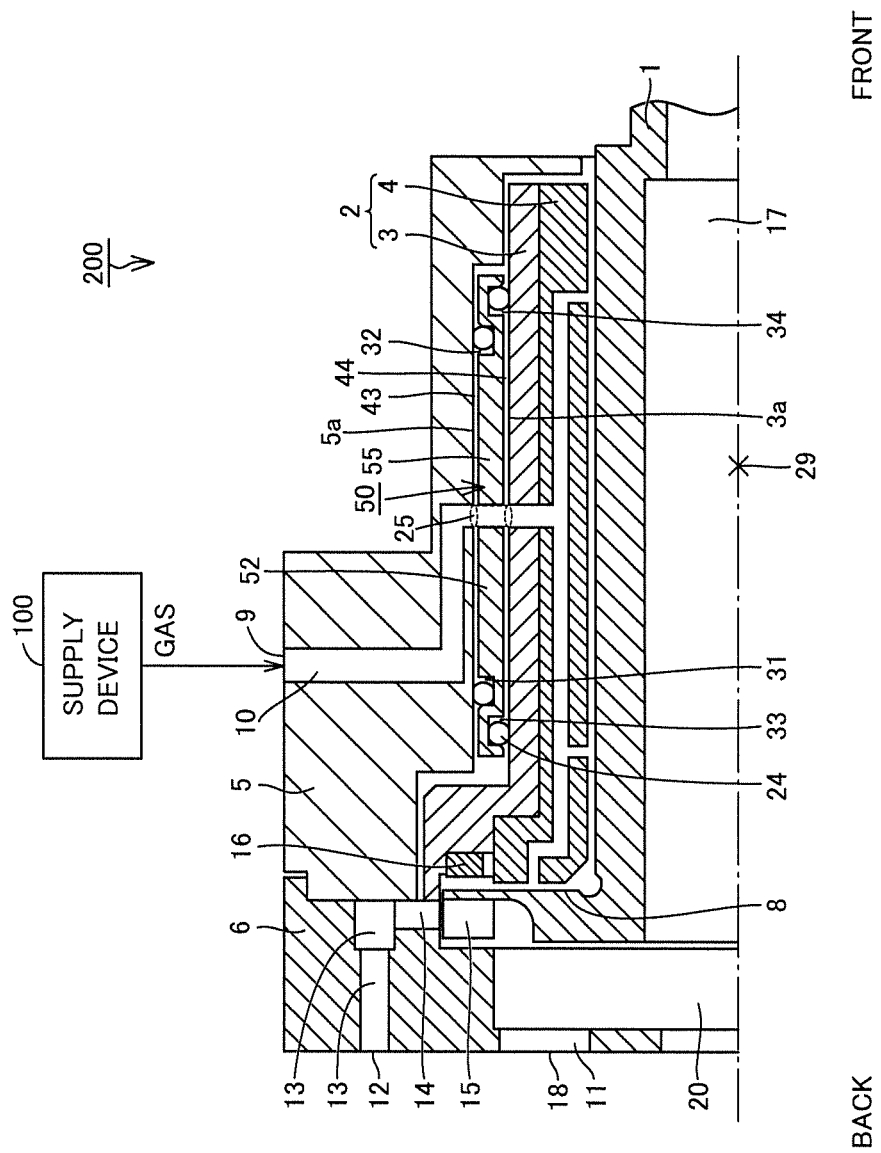
FIG. 2 is a partial schematic cross sectional view in the air turbine drive spindle according to the present embodiment.

The following describes a configuration of an air turbine drive spindle 200 according to the present embodiment with reference to FIG. 1 and FIG. 2. FIG. 1 is a schematic cross sectional view of air turbine drive spindle 200 according to the present embodiment. FIG. 2 is a partial schematic cross sectional view of air turbine drive spindle 200 according to the present embodiment.

Air turbine drive spindle 200 includes: a rotary shaft 1; a journal bearing 7 configured to support rotary shaft 1 in a radial direction; a thrust bearing 8 configured to support rotary shaft 1 in a thrust direction (axial direction); a bearing portion 2 configured to rotatably support rotary shaft 1 using journal bearing 7 and thrust bearing 8; a damper ring 50 located at the outer circumferential side relative to bearing portion 2; a cover member 5 located at the outer circumferential side relative to damper ring 50; a plurality of O rings 24 disposed between bearing portion 2 and damper ring 50 and between damper ring 50 and cover member 5; and the like.

A nozzle plate 6 is fixedly provided on cover member 5 to cover rotary shaft 1 in the thrust direction. Cover member 5 surrounds at least a portion of an outer circumferential surface 3a of a housing 3 included in bearing portion 2. Nozzle plate 6 is provided with a driving gas supply device (not shown). Each of journal bearing 7 and thrust bearing 8 is configured as a static pressure gas bearing, for example.

Rotary shaft 1 includes: a shaft portion 1b having a cylindrical shape; and a thrust plate portion 1c formed to extend to shaft portion 1b in the radial direction. Thrust plate portion 1c is coupled to an end portion of shaft portion 1b in the thrust direction. In the description below, the term "back side" represents a side at which thrust plate portion 1c is provided in the thrust direction, whereas the term "front side" represents a side of shaft portion 1b opposite to the back side in the thrust direction.

In shaft portion 1b and thrust plate portion 1c, a through hole 17 is formed to extend in the thrust direction. When air turbine drive spindle 200 is configured to be used for an electrostatic coating apparatus, a cup 80 having a conic shape is attached to an end portion of rotary shaft 1 at the front side. In through hole 17, a coating material supply tubing 45 for supplying a coating material to cup 80 is disposed. Thrust plate portion 1c is provided with: each rotor blade 15; and a rotation detection portion (not shown) disposed at an inner circumferential side relative to rotor blade 15.

A portion of shaft portion 1b of rotary shaft 1 is stored in bearing portion 2. Bearing portion 2 includes a housing 3 and a bearing sleeve 4. It should be noted that housing 3 corresponds to one embodiment of a "housing member". Bearing sleeve 4 corresponds to one embodiment of a "bearing member". Bearing sleeve 4 faces a portion of outer circumferential surface 1a of shaft portion 1b of rotary shaft 1 and a portion of a flat surface of thrust plate portion 1c at the front side, and is formed to surround a portion of shaft portion 1b. Housing 3 is disposed at the outer circumferential side relative to bearing sleeve 4 in the radial direction, and is fixed to bearing sleeve 4. Housing 3 surrounds at least a portion of outer circumferential surface 1a of shaft portion 1b from the outer circumferential side of bearing sleeve 4.

In thrust plate portion 1c of rotary shaft 1, a region located at the outer circumferential side in the radial direction has a thin portion having a thinner thickness in the thrust direction than that of a region (thick portion) located at the rotation center axis side (center side), The thick portion is formed to surround through hole 17. The thin portion is formed to surround the thick portion.

Rotor blade 15 is formed to extend in the thrust direction from a surface of the thin portion of thrust plate portion 1c at the back side. Rotary shaft 1 is provided to be rotatable when rotor blade 15 receives gas (also referred to as "driving gas") emitted from the driving gas supply device. The plurality of rotor blades 15 are provided to be spaced away from one another in the rotation direction of rotary shaft 1. Preferably, adjacent rotor blades 15 of the plurality of rotor blades 15 are provided at an equal interval. The plurality of rotor blades 15 are disposed along the outer circumference of thrust plate portion 1c. A cross sectional shape of each of the plurality of rotor blades 15 perpendicular to the thrust direction may be any shape. For example, this cross sectional shape has: a front curved portion that is located at the front side in the rotation direction and that is formed to protrude in the rotation direction; and a backside curved portion that is located at the back side in the rotation direction and that is formed to protrude in the rotation direction.

In thrust plate portion 1c, a boundary region between the thin portion and the thick portion is provided to gradually change in thickness in the thrust direction. That is, the surface of thrust plate portion 1c at the back side has a curved surface between the thin portion and the thick portion. A portion of rotor blade 15 at the back side and a portion of the thick portion at the back side are formed on the same plane extending in the radial direction.

On the surface of thrust plate portion 1c at the back side in the thick portion, the rotation detection portion (not shown) is formed. Any configuration for optically detecting rotation of rotary shaft 1 can be employed for the rotation detection portion, and the rotation detection portion may be surface-treated to have different reflectances for a plurality of regions divided in the rotation direction, for example. Specifically, a region, which is the half of the surface of the thick portion at the back side in the rotation direction of rotary shaft 1, is provided to provide a higher intensity of reflected light than that in the other half region when irradiated with light such as laser light.

Supply device 100 is, for example, an air compressor and is configured to supply (emit) gas (also referred to as "bearing gas") from a supply port 9. A bearing supply passage 10 is formed in portions of cover member 5, damper ring 50, housing 3, and bearing sleeve 4 in the radial direction. Bearing supply passage 10 communicates, via communication hole portions 25, with a gap 43 formed between cover member 5 and damper ring 50 and a gap 44 formed between damper ring 50 and housing 3. The bearing gas supplied from supply port 9 by supply device 100 flows into each of gap 43 and gap 44 via bearing supply passage 10. The bearing gas is compressed air, for example. It should be noted that gap 44 corresponds to one embodiment of a "first gap". Gap 43 corresponds to one embodiment of a "second gap".

A gap 41 is formed between shaft portion 1b and bearing sleeve 4. A gap 42 is formed between thrust plate portion 1c and bearing sleeve 4. Bearing supply passage 10 communicates with each of gap 41 and gap 42. The hole size of the portion of bearing supply passage 10 communicating with gap 41 and gap 42 is smaller than the hole size of supply port 9, thereby forming a so-called narrowed portion. When the bearing gas is supplied from supply device 100, bearing supply passage 10 and gaps 41 to 44 are filled with the bearing gas.

Journal bearing 7 is formed by supplying the bearing gas from supply device 100 to gap 41 via bearing supply passage 10. Thrust bearing 8 is formed by: thrusting force resulting from the bearing gas being supplied from supply device 100 to gap 42 via bearing supply passage 10; and attraction force of a magnet 16.

Magnet 16 is disposed in housing 3 at a region facing thrust plate portion 1c in the thrust direction. Magnet 16 applies magnetic force to thrust plate portion 1c. Magnet 16 is a permanent magnet, for example. Magnet 16 attracts thrust plate portion 1c using magnetic force. For example, magnet 16 is provided to face, in the thrust direction, the thin portion of thrust plate portion 1c provided with rotor blade 15. The planar shape of magnet 16 when seen in the thrust direction is an annular shape, for example.

Cover member 5 is fixed to nozzle plate 6 in the thrust direction. Nozzle plate 6 is formed to surround portions (the outer circumferential end surface of thrust plate portion 1c in the radial direction and the surface of thrust plate portion 1c at the back side) of rotary shaft 1 not stored in bearing portion 2 and cover member 5.

Nozzle plate 6 is disposed at the back side relative to rotary shaft 1. In nozzle plate 6, a driving gas supply passage 13 and a driving gas supply nozzle 14 are formed. Driving gas supply passage 13 has one end communicating with a driving gas supply port 12 at the inner circumferential surface of nozzle plate 6, and has the other end communicating with driving gas supply nozzle 14. Driving gas supply passage 13 and driving gas supply nozzle 14 serve as a flow passage for supplying the driving gas to rotor blade 15. The driving gas is compressed air, for example. Supply device 100 may also serve as the driving gas supply device (not shown) for supplying the driving gas from driving gas supply port 12, or the driving gas supply device may be different from supply device 100.

Driving gas supply nozzle 14 can emit the driving gas to rotor blade 15 in the radial direction from the outer circumferential side toward the inner circumferential side relative to rotary shaft 1. A plurality of driving gas supply passages 13 and a plurality of driving gas supply nozzles 14 may be formed with an interval therebetween in the rotation direction. In other words, driving gas supply passages 13 and driving gas supply nozzles 14 may allow the driving gas to be simultaneously supplied in the same rotation direction to rotor blades 15 provided in the rotation direction with an appropriate interval therebetween.

In nozzle plate 6, a rotation sensor insertion port 18 is formed at the outer circumferential side relative to through hole 17 in the radial direction. Rotation sensor insertion port 18 is formed to face, in the thrust direction, the rotation detection portion provided at thrust plate portion 1c. Rotation sensor insertion port 18 is formed such that a rotation sensor for emitting light such as laser light to the rotation detection portion and obtaining reflected light is disposed therein. With such a configuration, the rotating speed of rotary shaft 1 can be measured optically in air turbine drive spindle 200.

In nozzle plate 6, a gas exhaust hole 11 is formed at the center side relative to driving gas supply passage 13 and driving gas supply nozzle 14 in the radial direction. Gas exhaust hole 11 is formed to extend from a gas exhaust space 20 to communicate with the outside of nozzle plate 6.

Bearing supply passage 10 includes communication hole portions 25. A first groove 31 and a second groove 32 are disposed in the surface of damper ring 50 at the outer circumferential side (the cover member 5 side) so as to sandwich communication hole portion 25 in the thrust direction. A third groove 33 and a fourth groove 34 are disposed in the surface of damper ring 50 at the inner circumferential side (the bearing portion 2 side) so as to sandwich communication hole portion 25 in the thrust direction. Since communication hole portions 25 communicate with gaps 43, 44, the bearing gas supplied from supply port 9 by supply device 100 flows into gaps 43, 44 via communication hole portions 25.

Specifically, the bearing gas supplied from supply port 9 by supply device 100 passes through bearing supply passage 10, and then reaches communication hole portions 25. Part of the bearing gas flows into gap 43 via communication hole portion 25, and reaches first groove 31 and second groove 32. The bearing gas having reached first groove 31 and second groove 32 pushes, in a direction toward a region with a lower pressure (direction away from bearing supply passage 10), each of respective O rings 24 engaged with first groove 31 and second groove 32. Respective O rings 24 engaged with first groove 31 and second groove 32 are pushed by the bearing gas, and are accordingly brought into close contact with the inner circumferential surfaces of first groove 31 and second groove 32 of damper ring 50 and inner circumferential surface 5a of cover member 5, thereby blocking the flow passage for the bearing gas.

Meanwhile, part of the bearing gas flows into gap 44 via communication hole portion 25, and reaches third groove 33 and fourth groove 34. The bearing gas having reached third groove 33 and fourth groove 34 pushes, in a direction toward a region with a lower pressure (direction away from bearing supply passage 10), each of respective O rings 24 engaged with third groove 33 and fourth groove 34. Respective O rings 24 engaged with third groove 33 and fourth groove 34 are pushed by the bearing gas and are accordingly brought into contact with the inner circumferential surfaces of third groove 33 and fourth groove 34 of damper ring 50 and outer circumferential surface 3a of housing 3, thereby blocking the flow passage for the bearing gas.

Thus, the bearing gas supplied from supply device 100 remains in gap 43 and gap 44 due to the existence of O rings 24 and does not leak to outside. That is, each of O rings 24 has a sealing (hermetic sealing) property.

<Shape of Damper Ring>

Damper ring 50 is provided along outer circumferential surface 3a of housing 3 in the circumferential direction so as to surround bearing portion 2 in the radial direction at the outer circumferential side relative to bearing portion 2. Since air turbine drive spindle 200 includes damper ring 50, O rings 24 can be disposed in a plurality of stages in the radial direction. It should be noted that damper ring 50 corresponds to one embodiment of a "support member".

Figure 3:
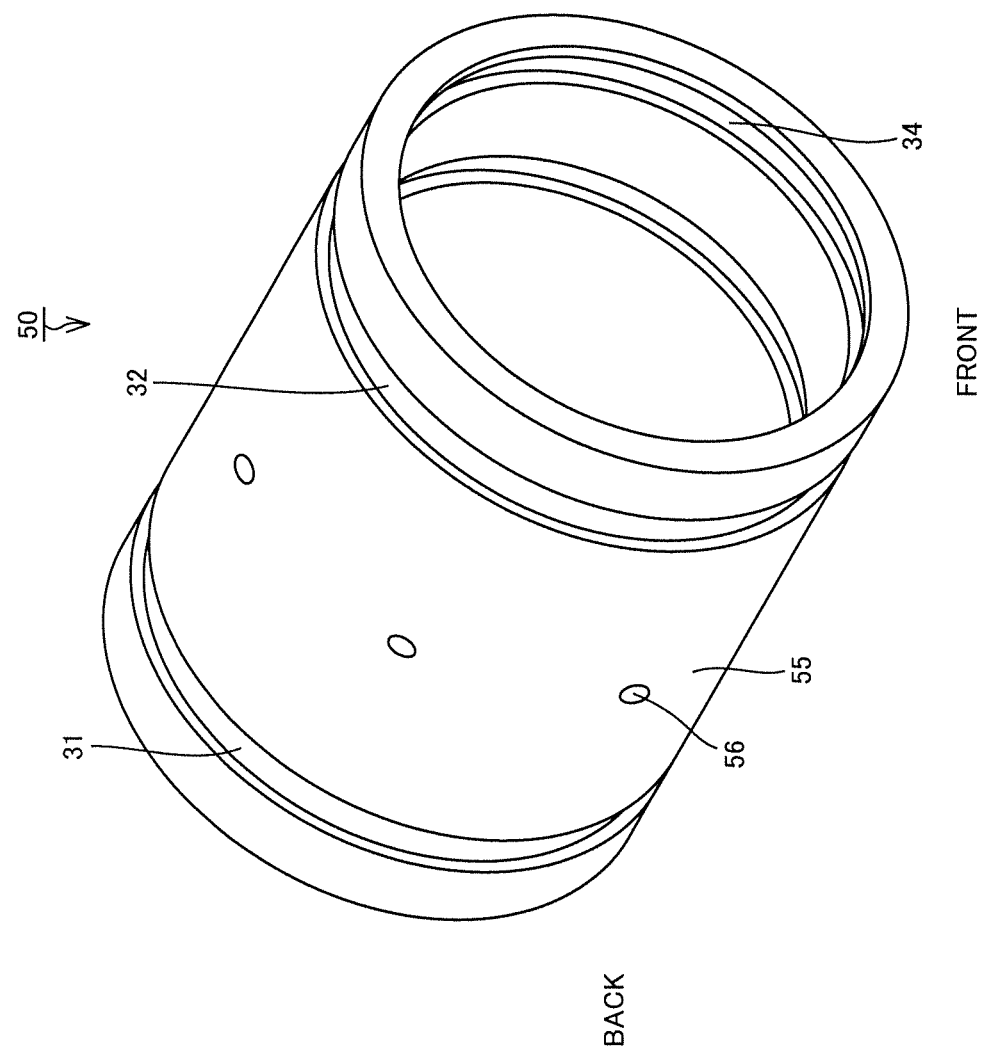
FIG. 3 is a schematic view showing an entire configuration of a damper ring according to the present embodiment.

With reference to FIG. 3, the following describes a shape of damper ring 50 according to the present embodiment. FIG. 3 is a schematic view showing an entire configuration of damper ring 50 according to the present embodiment. As shown in FIG. 3, damper ring 50 is a hollow annular member, has a base portion 55 provided with a plurality of holes 56 that constitute bearing supply passage 10 and that also correspond to communication hole portions 25.

As shown in FIG. 1 to FIG. 3, at least one or more grooves are formed in each of a surface of base portion 55 of damper ring 50 at the bearing portion 2 side (inner circumferential side) and a surface of base portion 55 of damper ring 50 at the cover member 5 side (the outer circumferential side) in the radial direction. In the present embodiment, first groove 31 is formed in the outer circumferential surface thereof at the back side relative to center of gravity 29 of air turbine drive spindle 900, i.e., at the back side relative to communication hole portions 25 (holes 56) of base portion 550. Further, third groove 33 is formed in the inner circumferential surface at the back side. Moreover, second groove 32 is formed in the outer circumferential surface at the front side relative to center of gravity 29 of air turbine drive spindle 900, i.e., at the front side relative to communication hole portions 25 (holes 56) of base portion 550. Further, fourth groove 34 is formed in the inner circumferential surface at the front side.

Each of grooves 31 to 34 is an annular groove formed in a surface of damper ring 50 to circumferentially extend around the rotation center axis of rotary shaft 1. As shown in FIG. 1 and FIG. 2, respective O rings 24 are engaged with grooves 31 to 34.

Respective O rings 24 engaged with first groove 31 and second groove 32 have cross sections having diameters longer than the depths of first groove 31 and second groove 32, and are in contact with inner circumferential surface 5a of cover member 5. Accordingly, gap 43 is formed between damper ring 50 and cover member 5 by O rings 24 engaged with first groove 31 and second groove 32. Damper ring 50 and cover member 5 are not in direct contact with each other due to the existence of gap 43.

Respective O rings 24 engaged with third groove 33 and fourth groove 34 have cross sections having diameters longer than the depths of third groove 33 and fourth groove 34, and are in contact with outer circumferential surface 3a of housing 3. Accordingly, gap 44 is formed between damper ring 50 and housing 3 by respective O rings 24 engaged with third groove 33 and fourth groove 34. Damper ring 50 and housing 3 are not in direct contact with each other due to the existence of gap 44.

By respective O rings 24 engaged with third groove 33 and fourth groove 34, a bearing unit (rotary shaft 1, bearing portion 2, and the like) is held to be fixed to cover member 5 with damper ring 50 being interposed therebetween.

Each of O rings 24 is a member with elasticity. When air turbine drive spindle 200 is operated, vibration is generated due to whirling at the tip side of rotary shaft 1 having cup 80 attached thereto. When the vibration is transferred to respective O rings 24 engaged with grooves 31 to 34, the O rings are deformed due to the elasticity. Each of O rings 24 can be deformed to absorb the vibration. Thus, O ring 24 has a damping property.

As a material of damper ring 50, a metal such as stainless steel is used.

<Shapes of Grooves>

Figure 4:
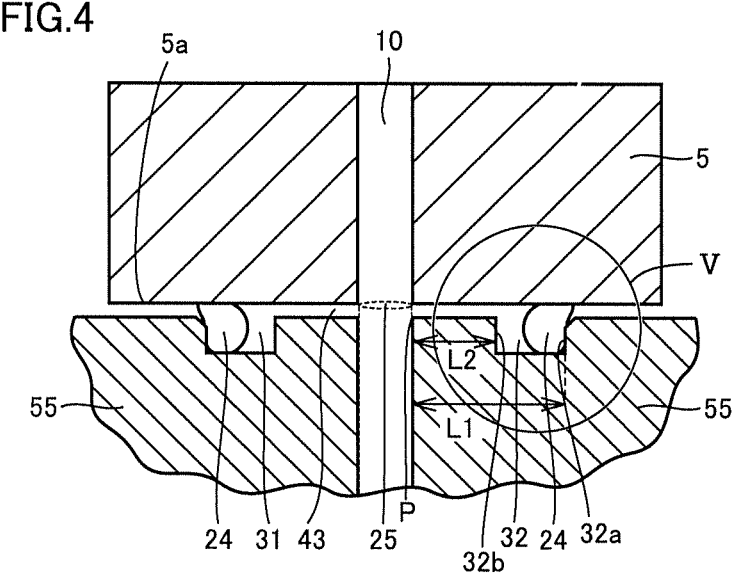
FIG. 4 is a schematic cross sectional view showing a first groove and a second groove according to the present embodiment.
Figure 5:
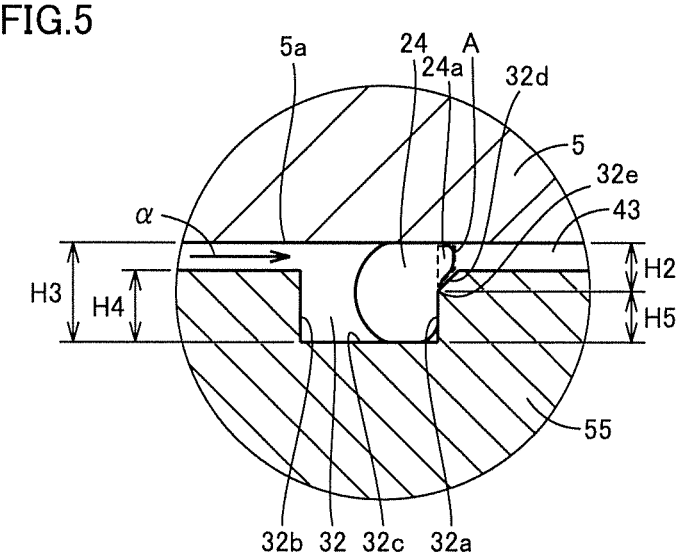
FIG. 5 is an enlarged schematic cross sectional view of the second groove according to the present embodiment shown in FIG. 4.

Next, with reference to FIG. 4 and FIG. 5, the following specifically describes the shapes of grooves 31 to 34 provided in air turbine drive spindle 200 according to the present embodiment. FIG. 4 is a schematic cross sectional view showing first groove 31 and second groove 32 according to the present embodiment. FIG. 5 is an enlarged schematic cross sectional view of second groove 32 according to the present embodiment shown in FIG. 4. It should be noted that FIG. 4 and FIG. 5 are schematic views for illustrating the shapes of first groove 31 and second groove 32, and the thickness of base portion 55 of damper ring 50 and a distance between the grooves are different from actual thickness and distance for the sake of simplification of description.

Moreover, here, the shape of second groove 32 will be described with reference to FIG. 4 and FIG. 5; however, first groove 31 also has the same shape and exhibits the same function and effect. Moreover, third groove 33 and fourth groove 34 also have the same shapes as those of first groove 31 and second groove 32, and exhibit the same function and effect. Specifically, as shown in FIG. 2, the shape of third groove 33 is the same as a shape obtained by inversing the shape of first groove 31 toward the inner circumferential side of damper ring 50, and the shape of fourth groove 34 is the same as a shape obtained by inversing the shape of second groove 32 toward the inner circumferential side of damper ring 50.

As shown in FIG. 4 and FIG. 5, second groove 32 includes a first side wall 32a, a second side wall 32b, a bottom portion 32c (bottom surface), and a chamfered portion 32d. A distance L1 from communication hole portion 25 (specifically, an intersection P between bearing supply passage 10 and gap 43) to first side wall 32a is longer than a distance L2 from communication hole portion 25 to second side wall 32b. In other words, first side wall 32a represents a side wall at the downstream side of the flow (see an arrow a of FIG. 5) of the bearing gas supplied by supply device 100, and second side wall 32b represents a side wall at the upstream side of the flow of the bearing gas.

A height H5 from bottom portion 32c to the upper end (top portion 32e) of first side wall 32a is lower than a height H4 from bottom portion 32c to the upper end of second side wall 32b. Thus, in order to obtain height H5 lower than height H4, chamfered portion 32d continuous to the upper side of first side wall 32a is formed in the present embodiment. In the example of FIG. 4 and FIG. 5, chamfered portion 32d is a tapered surface. A space A is formed by forming the tapered surface.

A distance H2 shown in FIG. 5 represents a range (distance) in which O ring 24 is not in contact with another component (base portion 55 of damper ring 50), in the radial direction. In other word, distance H2 also represents a distance to inner circumferential surface 5a of cover member 5 from a location (i.e., top portion 32e) of first side wall 32a closest to inner circumferential surface 5a of cover member 5. A distance H3 represents a distance from bottom portion 32c to inner circumferential surface 5a of cover member 5.

<Operation of Air Turbine Drive Spindle>

Next, the following describes an operation of air turbine drive spindle 200 according to the present embodiment.

When air turbine drive spindle 200 is operated, the driving gas is supplied from driving gas supply port 12 to driving gas supply nozzle 14 via driving gas supply passage 13. The driving gas supplied to driving gas supply nozzle 14 is emitted toward rotor blade 15 of thrust plate portion 1c of rotary shaft 1 along a direction substantially parallel to the tangential direction (rotation direction) of thrust plate portion 1c. Rotor blade 15 receives the emitted driving gas at the backside curved portion. On this occasion, the driving gas emitted toward rotor blade 15 reaches the outer circumferential side of the backside curved portion, is changed in direction by flowing along the backside curved portion, and is exhausted to outside from gas exhaust hole 11 via gas exhaust space 20. Reaction force of force applied to the driving gas acts on rotor blade 15, thereby providing thrust plate portion 1c of rotary shaft 1 with rotation torque. Accordingly, rotary shaft 1 is rotated along the rotation direction. The rotating speed of rotary shaft 1 can be more than or equal to several tens of thousands rpm, for example. Hence, air turbine drive spindle 200 is suitable for a spindle for electrostatic coating apparatuses, for example.

Reference Example

Figure 20:
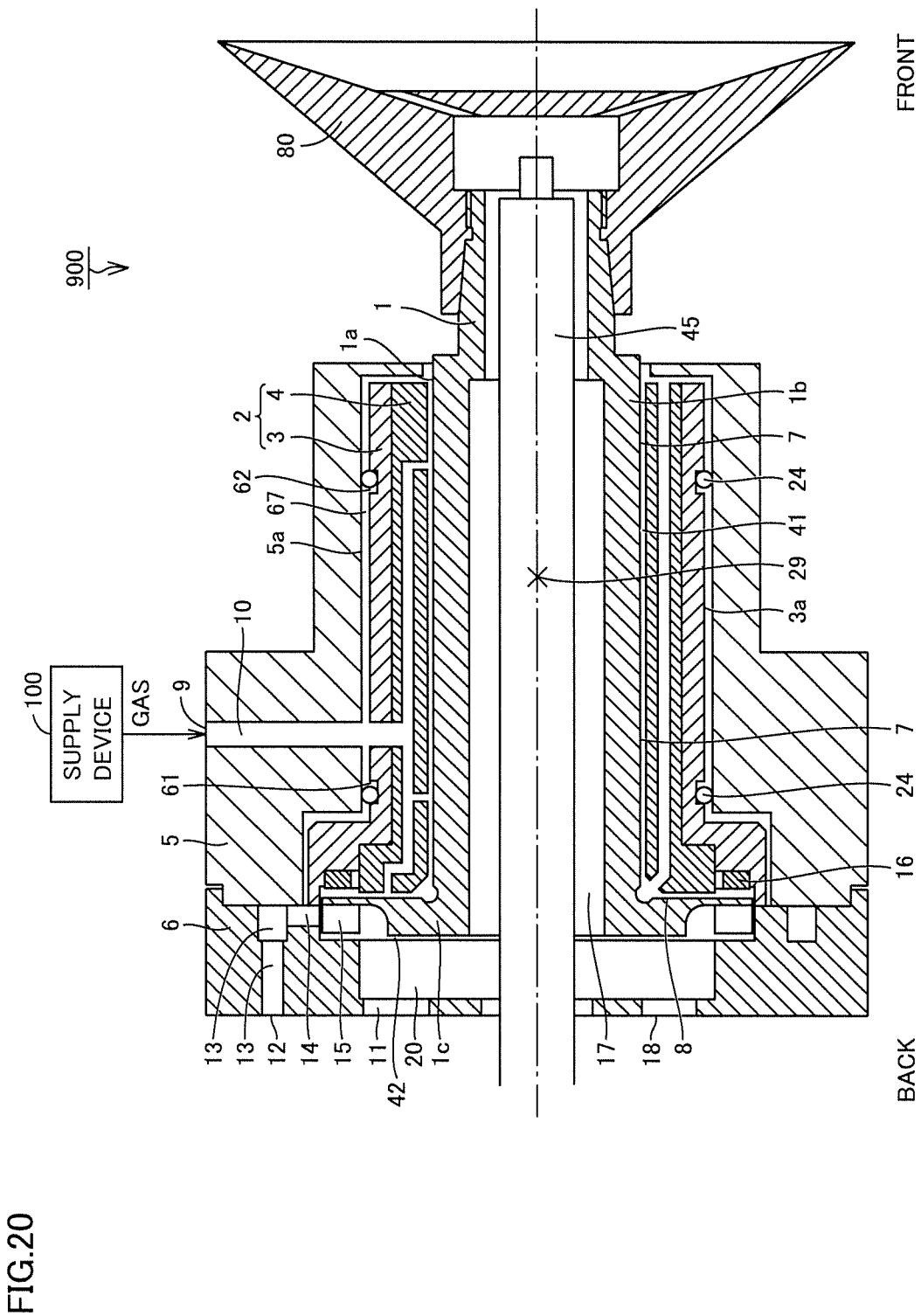
FIG. 20 is a schematic cross sectional view of the air turbine drive spindle according to the reference example.

As a prerequisite for explanation of function and effect exhibited by air turbine drive spindle 200 according to the present embodiment, the following describes a configuration of an air turbine drive spindle 900 according to a reference example. FIG. 20 is a schematic cross sectional view of air turbine drive spindle 900 according to the reference example. It should be noted that in the description below, only different configuration and operation of air turbine drive spindle 900 according to the reference example from those of air turbine drive spindle 200 according to the present embodiment will be described.

As shown in FIG. 20, a first groove 61 and a second groove 62 are formed in outer circumferential surface 3a of housing 3. First groove 61 and second groove 62 are annular grooves formed in outer circumferential surface 3a of housing 3 to circumferentially extend around the rotation center axis of rotary shaft 1. First groove 61 is disposed at the back side relative to center of gravity 29 of air turbine drive spindle 900 in the thrust direction of rotary shaft 1. Second groove 62 is disposed at the front side relative to center of gravity 29 in the thrust direction of rotary shaft 1.

Respective O rings 24 are engaged with first groove 61 and second groove 62. Respective O rings 24 engaged with first groove 61 and second groove 62 have cross sections having diameters longer than the respective depths of first groove 61 and second groove 62, and are in contact with inner circumferential surface 5a of cover member 5. Accordingly, a gap 67 is formed between housing 3 and cover member 5 by respective O rings 24 engaged with first groove 61 and second groove 62. Housing 3 and cover member 5 are not in direct contact with each other due to the existence of gap 67.

By respective O rings 24 engaged with first groove 61 and second groove 62, a bearing unit (rotary shaft 1, bearing portion 2, and the like) is held to be fixed to cover member 5.

In air turbine drive spindle 900 configured as described above according to the reference example, vibration resulting from rotation of rotary shaft 1 is transferred to bearing sleeve 4, housing 3, and O rings 24 in this order. On this occasion, the vibration from rotary shaft 1 is damped by elastic force of O rings 24 each including a rubber material. Accordingly, even when the vibration resulting from the rotation of rotary shaft 1 is transferred in the radial direction, the vibration from the rotary shaft is damped by the elasticity of O rings 24. As a result, outer circumferential surface 3a of housing 3 and inner circumferential surface 5a of cover member 5 are highly unlikely to be brought into contact with each other, whereby rotary shaft 1 can be stably rotated at a high speed.

Here, since air turbine drive spindle 900 is used in a solvent atmosphere, a material excellent in solvent resistance is preferably used for each of O rings 24. For such a material excellent in solvent resistance, perfluoroelastomer has been known. Perfluoroelastomer is excellent in solvent resistance, but has a hardness higher than that of a rubber material generally used for an O ring 24, such as a fluororubber or a nitrile rubber. Accordingly, when perfluoroelastomer is used for the material of O ring 24, the vibration resulting from the rotation of rotary shaft 1 may be unable to be sufficiently absorbed by O ring 24 in the configuration such as air turbine drive spindle 900 according to the reference example.

To address this, in air turbine drive spindle 200 according to the present embodiment, damper ring 50 is used such that O rings 24 are disposed therein in a plurality of stages in the radial direction in order to damp the vibration from rotary shaft 1 in the plurality of stages.

<Function and Effect>

As shown in FIG. 1 and FIG. 2, in air turbine drive spindle 200 configured as described above according to the present embodiment, the vibration transferred from rotary shaft 1 via bearing portion 2 is first damped by the elasticity of O rings 24 disposed in gap 44 located between the outer circumferential surface of housing 3 and the inner circumferential surface of damper ring 50, is then damped when transferred in damper ring 50, and is further damped by the elasticity of O rings 24 disposed in gap 43 located between the outer circumferential surface of damper ring 50 and the inner circumferential surface of cover member 5. Since the vibration from rotary shaft 1 is thus damped in the plurality of stages, rotary shaft 1 can be stably rotated at a high speed in air turbine drive spindle 200.

As a result, rotary shaft 1 can be stably rotated at a high speed in air turbine drive spindle 200 not only when a rubber material such as fluororubber and nitrile rubber is used as the material of O ring 24 but also when perfluoroelastomer having a high hardness and excellent in solvent resistance as compared with the rubber material is used as the material of O ring 24.

As shown in FIG. 1 and FIG. 2, by respective O rings 24 engaged with grooves 31 to 34 disposed to sandwich communication hole portions 25, the driving gas supplied from communication hole portion 25 can be blocked.

It should be noted that as the material of damper ring 50, a material having a smaller Young's modulus may be used. When the material having a smaller Young's modulus is included in the material of damper ring 50, an amount of deformation of damper ring 50 with respect to external force can be increased, whereby damper ring 50 is more likely to be distorted. Therefore, as the material of damper ring 50, it is preferable to use aluminum, which is a metal having a Young's modulus smaller than that of stainless steel. Further, as the material of damper ring 50, it is preferable to use a resin having a Young's modulus smaller than those of metals such as stainless steel and aluminum. When the resin is included in the material of damper ring 50, damper ring 50 is more likely to be distorted as compared with a case where a metal is included in the material of damper ring 50, whereby the vibration from rotary shaft 1 can be more damped by damper ring 50.

Moreover, the thickness of damper ring 50 in the thrust direction can be made as thin as possible. For example, the thickness of base portion 55 of damper ring 50 may be the minimum thickness with which each of grooves 31 to 34 can be formed. In this way, the amount of deformation of damper ring 50 with respect to external force can be increased and damper ring 50 is more likely to be distorted, whereby the vibration from rotary shaft 1 can be more damped by damper ring 50.

The bearing gas supplied from supply device 100 to bearing supply passage 10 is supplied to gap 43 via communication hole portion 25 in the direction of arrow a (see FIG. 5). When the bearing gas is supplied to gap 43, as shown in FIG. 4 and FIG. 5, each of O rings 24 is pushed in the direction toward a region with a lower pressure (direction away from communication hole portion 25) due to influence of the bearing gas (compressed air). When O ring 24 is pushed in the direction toward a region with a lower pressure, O ring 24 is pushed against (pressed into contact with) first side wall 32a and is accordingly deformed. Accordingly, one portion 24a of O ring 24 moves in space A in such a state that a surface of one portion 24a is not constrained and one portion 24a has elastic force.

In other words, even when O ring 24 is pressed into contact with first side wall 32a, the surface of one portion 24a of O ring 24 is not constrained and can be deformed comparatively freely because height H5 of first side wall 32a is lower than height H4. Therefore, even when O ring 24 is pressed into contact with first side wall 32a, the volume of one portion 24a of O ring 24 can be sufficiently large. Hence, even when the bearing gas is supplied to gap 43, elastic stroke of O ring 24 is secured due to the existence of one portion 24a, whereby the damping property of O ring 24 is secured.

Figure 6:
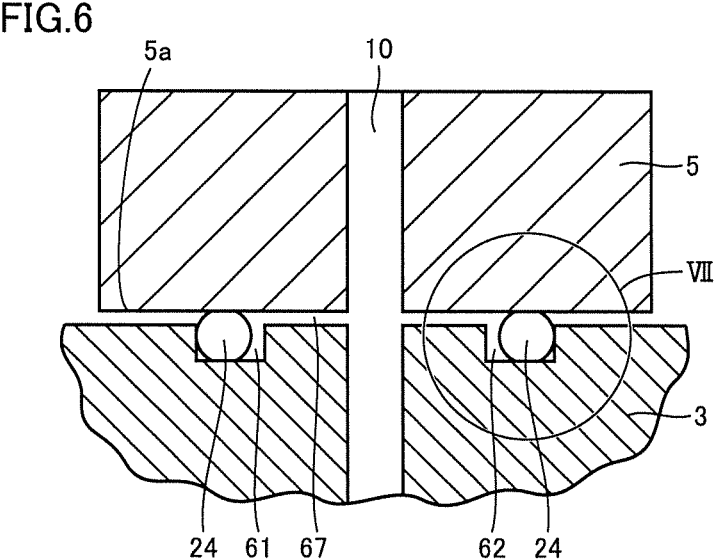
FIG. 6 is a schematic cross sectional view when bearing gas is not supplied in a first groove and a second groove provided in an air turbine drive spindle according to a reference example.
Figure 7:
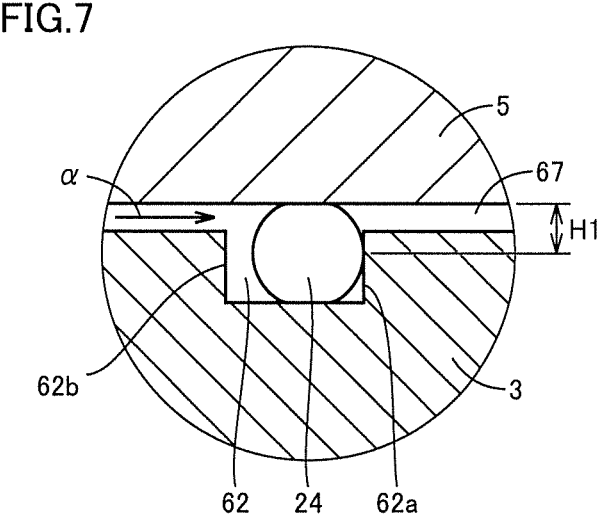
FIG. 7 is an enlarged schematic cross sectional view of the second groove according to the reference example shown in FIG. 6.
Figure 8:
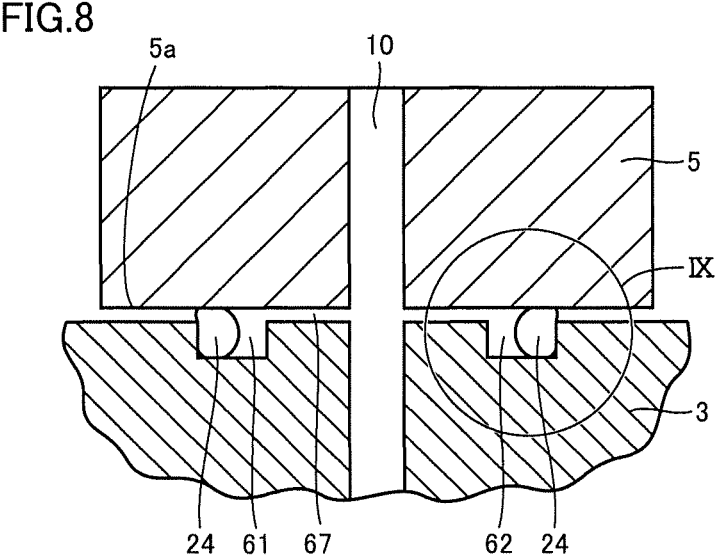
FIG. 8 is a schematic cross sectional view when the bearing gas is supplied in the first groove and the second groove provided in the air turbine drive spindle according to the reference example.
Figure 9:
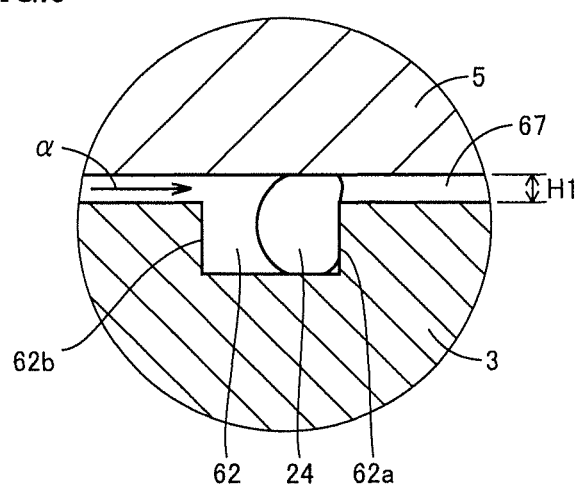
FIG. 9 is an enlarged schematic cross sectional view of the second groove according to the reference example shown in FIG. 8.

Here, with reference to FIG. 6 to FIG. 9, the following describes a case where the bearing gas is supplied to gap 67 formed between housing 3 and cover member 5 in air turbine drive spindle 900 according to the reference example. FIG. 6 is a schematic cross sectional view when the bearing gas is not supplied in first groove 61 and second groove 62 provided in the air turbine drive spindle according to the reference example. FIG. 7 is an enlarged schematic cross sectional view of second groove 62 according to the reference example shown in FIG. 6. FIG. 8 is a schematic cross sectional view when the bearing gas is supplied in first groove 61 and second groove 62 provided in the air turbine drive spindle according to the reference example. FIG. 9 is an enlarged schematic cross sectional view of second groove 62 according to the reference example shown in FIG. 8. It should be noted that in FIG. 6 to FIG. 9, the thickness of housing 3 and a distance between the grooves are different from actual thickness and distance for the sake of simplification of description. Moreover, a distance H1 shown in FIG. 7 and FIG. 9 represents a range in which O ring 24 is not in contact with another component (housing 3) in the outer diameter direction. This range is a range in which O ring 24 has elastic force.

As shown in FIG. 7, the respective heights of side walls 62a, 62b of second groove 62 engaged with O ring 24 are the same. Therefore, when the bearing gas is supplied from supply device 100 to gap 43, an amount of decrease of distance H1 is larger than that in air turbine drive spindle 200 according to the present embodiment as shown in FIG. 7 and FIG. 9. The amount of decrease of distance H1 refers to a difference between "distance H1 (see FIG. 7) when the bearing gas is not supplied to gap 43" and "distance H1 (see FIG. 9) when the bearing gas is supplied to gap 43".

Since the amount of decrease of distance H1 is thus large, distance H1 when the bearing gas is supplied as shown in FIG. 9 becomes small, with the result that elastic stroke of O ring 24 becomes small. Therefore, in air turbine drive spindle 900 of the reference example, the damping property is deteriorated when the bearing gas is supplied from supply device 100, as compared with a case where the bearing gas is not supplied.

On the other hand, in air turbine drive spindle 200 of the present embodiment, as shown in FIG. 5, height H5 of first side wall 32a is lower than height H4 of second side wall 32b. Therefore, when the bearing gas is supplied from supply device 100, as compared with air turbine drive spindle 900 of the reference example, distance H2 corresponding to the size of one portion 24a constituting the elastic stroke of O ring 24 can be larger than distance H1 (see FIG. 9) as shown in FIG. 5. That is, the amount of decrease of distance H2 can be reduced. Here, the amount of decrease of distance H2 refers to a difference between "distance H2 when the bearing gas is not supplied to gap 43" and "distance H2 when bearing gas is supplied to gap 43". Accordingly, the amount of reduction of the elastic stroke of O ring 24 can be reduced, whereby the damping property of air turbine drive spindle 200 can be suppressed from being deteriorated when the bearing gas is supplied.

Moreover, height H5 of first side wall 32a preferably corresponds to the radius of the cross section of O ring 24. Accordingly, when the bearing gas is supplied from supply device 100, O ring 24 can be prevented from deviating from second groove 32 while suppressing deterioration of the damping property of air turbine drive spindle 200.

Modifications

Heretofore, the main embodiment in the present invention has been described; however, the present invention is not limited to the above-described embodiment, and can be modified or applied in various manners. Hereinafter, modifications of the above-described embodiment applicable to the present invention will be described.

<Damper Ring According to First Modification>

Figure 10:
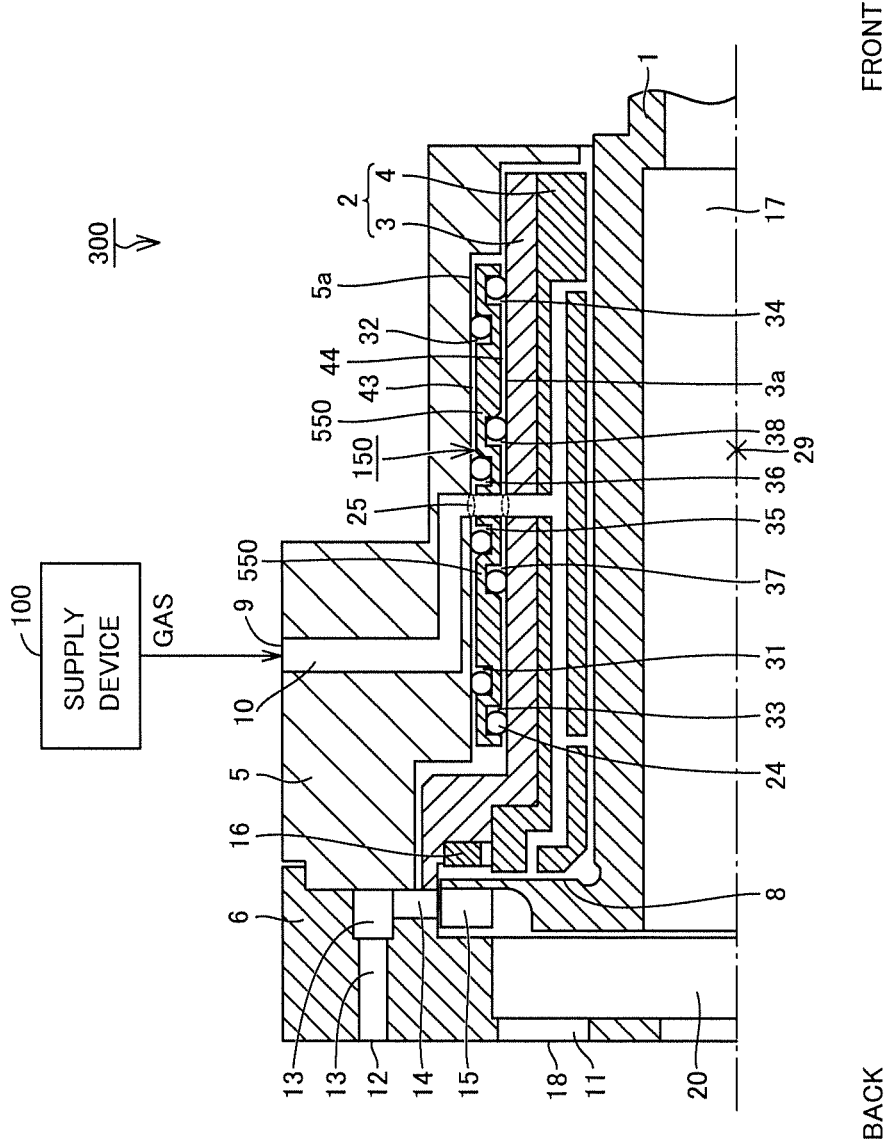
FIG. 10 is a partial schematic cross sectional view in an air turbine drive spindle including a damper ring according to a first modification.
Figure 11:
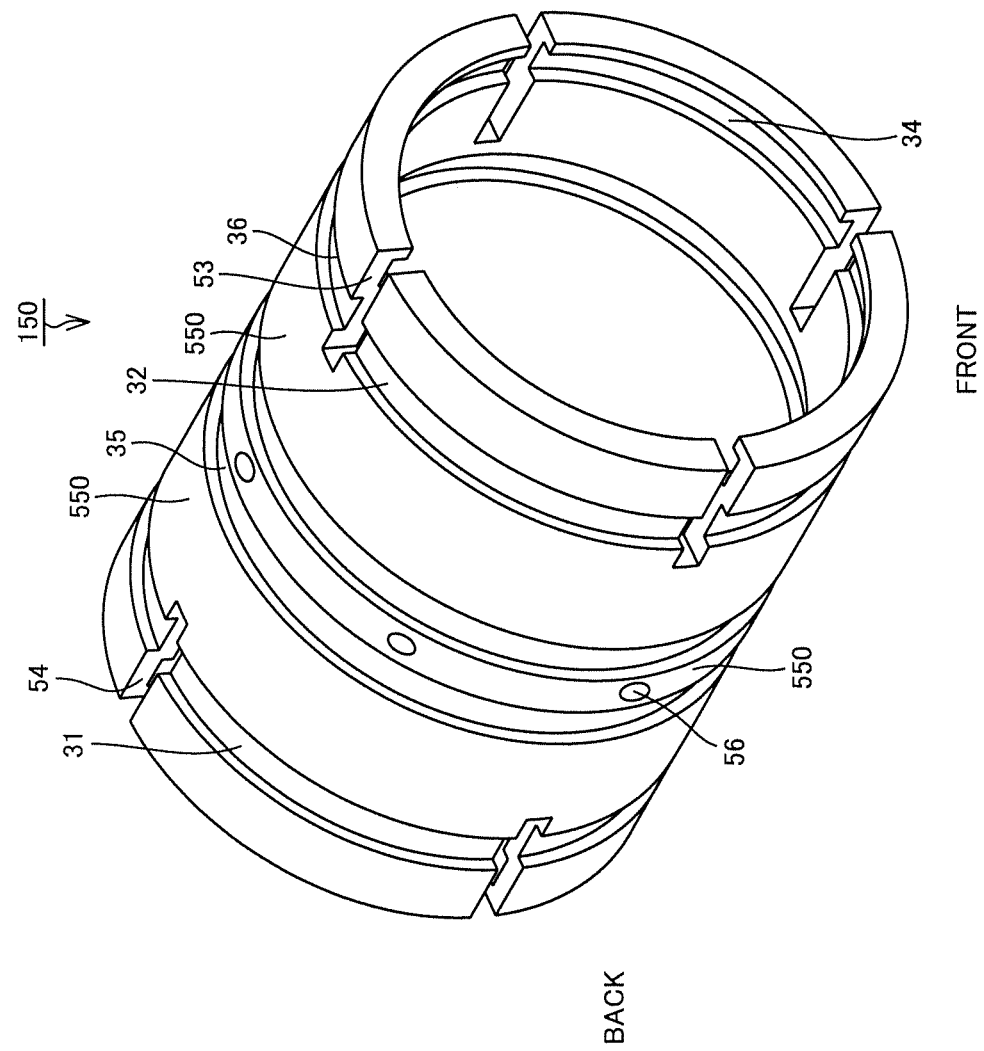
FIG. 11 is a schematic view showing an entire configuration of the damper ring according to the first modification.

With reference to FIG. 10 and FIG. 11, an air turbine drive spindle 300 according to a first modification will be described. FIG. 10 is a partial schematic cross sectional view in air turbine drive spindle 300 including a damper ring 150 according to the first modification. FIG. 11 is a schematic view showing an entire configuration of damper ring 150 according to the first modification. It should be noted that configurations of air turbine drive spindle 300 according to the first modification other than the below-described configuration are the same as the configurations of air turbine drive spindle 200 according to the present embodiment.

As shown in FIG. 1 and FIG. 2, in air turbine drive spindle 200 according to the present embodiment, damper ring 50 is provided with the four grooves, i.e., first groove 31, second groove 32, third groove 33, and fourth groove 34, and respective O rings 24 are engaged with grooves 31 to 34. However, each of the number of grooves and the number of O rings 24 is not limited to four and may be a different number as long as O rings 24 are disposed in the plurality of stages in the radial direction.

For example, as shown in FIG. 10 and FIG. 11, a damper ring 150 according to the modification may be provided with another four grooves, i.e., a fifth groove 35, a sixth groove 36, a seventh groove 37, and an eighth groove 38 in addition to first groove 31, second groove 32, third groove 33, and fourth groove 34, and respective O rings 24 are engaged with grooves 31 to 38. It should be noted that grooves 31 to 34 correspond to one embodiment of a "groove for damping". Grooves 35 to 38 correspond to one embodiment of a "groove for sealing".

Specifically, first groove 31 and fifth groove 35 are formed in the outer circumferential surface (the surface at the cover member 5 side) of damper ring 150 at the back side relative to communication hole portion 25 (hole 56) of base portion 550 included in damper ring 150, and third groove 33 and seventh groove 37 are formed in the inner circumferential surface (the surface at the bearing portion 2 side) thereof at the back side. Second groove 32 and sixth groove 36 are formed in the outer circumferential surface (the surface at the cover member 5 side) of damper ring 150 at the front side relative to communication hole portion 25 (hole 56) of base portion 550 included in damper ring 150, and fourth groove 34 and eighth groove 38 are formed in the inner circumferential surface (the surface at the bearing portion 2 side) thereof at the front side.

Fifth groove 35 and sixth groove 36 are disposed in the outer circumferential surface of damper ring 150 so as to sandwich communication hole portion 25 in the thrust direction. Further, first groove 31 and second groove 32 are disposed in the outer circumferential surface of damper ring 150 so as to sandwich fifth groove 35 and sixth groove 36 in the thrust direction.

Seventh groove 37 and eighth groove 38 are disposed in the inner circumferential surface of damper ring 150 so as to sandwich communication hole portion 25. Further, third groove 33 and fourth groove 34 are disposed in the inner circumferential surface of damper ring 150 so as to sandwich seventh groove 37 and eighth groove 38.

As with grooves 31 to 34, each of grooves 35 to 38 is an annular groove formed in the surface of damper ring 150 to circumferentially extend around the rotation center axis of rotary shaft 1. As shown in FIG. 10, as with grooves 31 to 34, respective O rings 24 are engaged with grooves 35 to 38.

Respective O rings 24 engaged with fifth groove 35 and sixth groove 36 have cross sections having diameters longer than the depths of fifth groove 35 and sixth groove 36, and are in contact with inner circumferential surface 5a of cover member 5. Accordingly, a gap 43 is formed between damper ring 150 and cover member 5 by respective O rings 24 engaged with fifth groove 35 and sixth groove 36. Damper ring 150 and cover member 5 are not in direct contact with each other due to the existence of gap 43.

Respective O rings 24 engaged with seventh groove 37 and eighth groove 38 have cross sections having diameters longer than the depths of seventh groove 37 and eighth groove 38, and are in contact with outer circumferential surface 3a of housing 3. Accordingly, a gap 44 is formed between damper ring 150 and housing 3 by respective O rings 24 engaged with seventh groove 37 and eighth groove 38. Damper ring 150 and housing 3 are not in direct contact with each other due to the existence of gap 44.

When the number of grooves formed in damper ring 150 is increased and respective O rings 24 are engaged with the grooves in this way, vibration from rotary shaft 1 transferred via bearing portion 2 can be damped by elastic force of the multiplicity of O rings 24.

Furthermore, as shown in FIG. 11, in base portion 550 of damper ring 150, cuts 53 are formed in the end portion at the front side in the thrust direction. Moreover, in base portion 550 of damper ring 50, cuts 54 are formed in the end portion at the back side in the thrust direction.

Since cuts 53, 54 are thus formed in the end portions of damper ring 150 in the thrust direction, an amount of deformation of damper ring 150 with respect to external force can be increased and damper ring 150 is more likely to be distorted. Therefore, the vibration from rotary shaft 1 can be damped more. It should be noted that cuts 53, 54 may be provided in the end portions in the thrust direction not only in damper ring 150 according to the first modification but also in damper ring 50 according to the present embodiment.

Here, in damper ring 50 according to the present embodiment, respective O rings 24 engaged with grooves 31 to 34 have a damping property and a sealing property. However, in damper ring 150 according to the modification, respective O rings 24 engaged with grooves 35 to 38 formed at the side close to communication hole portions 25 may have a damping property and a sealing property, whereas respective O rings 24 engaged with grooves 31 to 34 may have a damping property as a main property.

Specifically, part of the bearing gas supplied from supply port 9 by supply device 100 flows into gap 43 via communication hole portion 25, and reaches fifth groove 35 and sixth groove 36. The bearing gas having reached fifth groove 35 and sixth groove 36 pushes, in a direction toward a region with a lower pressure (direction away from bearing supply passage 10), each of respective O rings 24 engaged with fifth groove 35 and sixth groove 36. Respective O rings 24 engaged with fifth groove 35 and sixth groove 36 are pushed by the bearing gas, and are accordingly brought into close contact with the outer circumferential surface of damper ring 150 and inner circumferential surface 5a of cover member 5, thereby blocking the flow passage for the bearing gas. With such a sealing property for each of fifth groove 35 and sixth groove 36, the bearing gas does not reach first groove 31 and second groove 32 both formed at the side far from communication hole portion 25 relative to fifth groove 35 and sixth groove 36. Accordingly, respective O rings 24 engaged with first groove 31 and second groove 32 have a damping property as a main property.

On the other hand, part of the bearing gas supplied from supply port 9 by supply device 100 flows into gap 44 via communication hole portion 25, and reaches seventh groove 37 and eighth groove 38. The bearing gas having reached seventh groove 37 and eighth groove 38 pushes, in a direction toward a region with a lower pressure (direction away from bearing supply passage 10), each of respective O rings 24 engaged with seventh groove 37 and eighth groove 38. Respective O rings 24 engaged with seventh groove 37 and eighth groove 38 are pushed by the bearing gas, and are accordingly brought into close contact with the inner circumferential surface of damper ring 150 and outer circumferential surface 3a of bearing portion 2, thereby blocking the flow passage for the bearing gas. With such a sealing property for seventh groove 37 and eighth groove 38, the bearing gas does not reach third groove 33 and fourth groove 34 both formed at the side far from communication hole portion 25 relative to seventh groove 37 and eighth groove 38. Accordingly, respective O rings 24 engaged with third groove 33 and fourth groove 34 have a damping property as a main property.

As such, the bearing gas supplied from communication hole portions 25 can be blocked by respective O rings 24 engaged with grooves 35 to 38 formed at the side close to communication hole portion 25 for the sake of sealing, whereas the vibration from rotary shaft 1 can be damped by respective O rings 24 engaged with grooves 31 to 34 formed at the side far from communication hole portion 25 for the sake of damping.

Since grooves 35 to 38 formed at the side close to communication hole portion 25 are formed at locations close to center of gravity 29, vibration is generated due to precession centered on each of respective O rings 24 engaged with grooves 35 to 38 when rotary shaft 1 is rotated. On the other hand, since grooves 31 to 34 formed at the side far from communication hole portion 25 are formed at locations far away from center of gravity 29 relative to grooves 35 to 38, vibration is generated in respective O rings 24 engaged with grooves 31 to 34 due to precession larger than that in respective O rings 24 engaged with grooves 35 to 38. In respective O rings 24 engaged with grooves 31 to 34, the damping property is not decreased due to flow of the bearing gas, so that the vibration due to the precession can be sufficiently absorbed.

As such, since respective O rings 24 engaged with grooves 35 to 38 formed at the side close to communication hole portion 25 are provided for the sake of sealing and respective O rings 24 engaged with grooves 31 to 34 formed at the side far from communication hole portion 25 are provided for the sake of damping, the respective properties of O rings 24 can be exhibited.

It should be noted that since the shapes of grooves 31 to 34 formed in damper ring 50 described with reference to FIG. 4 and FIG. 5 according to the present embodiment are effective when mainly applied to grooves for sealing, the shapes of grooves 31 to 34 may be applied to the shapes of grooves 35 to 38 formed in damper ring 150 according to the modification. In this case, the shapes of grooves 31 to 34 formed in damper ring 50 does not necessarily need to be applied to the shapes of grooves 31 to 34 formed in damper ring 150 according to the modification.

It should be noted that in the configuration in which O rings 24 are disposed in a plurality of stages in the radial direction, the number of grooves and the number of O rings 24 are not limited to those described above. For example, one groove engaged with O ring 24 may be formed in the outer circumferential side of the damper ring, and a plurality of grooves engaged with O rings 24 may be formed in the inner circumferential side of the damper ring. Alternatively, a plurality of grooves engaged with O rings 24 may be formed in the outer circumferential side of the damper ring, and one groove engaged with O ring 24 may be formed in the inner circumferential side of the damper ring. At least one or more grooves engaged with O rings 24 may be formed in each of the surface of the damper ring at the bearing portion 2 side and the surface of the damper ring at the cover member 5 side.

<Material of O Ring>

Each of respective O rings 24 engaged with grooves 35 to 38 formed at the side close to communication hole portion 25 may be composed of a material different from that of each of respective O rings 24 engaged with grooves 31 to 34 formed at the side far from communication hole portion 25. Accordingly, a degree of freedom in selecting a material is improved.

For example, respective O rings 24 engaged with grooves 35 to 38 provided for the sake of sealing are highly, unlikely to be exposed to an external atmosphere because respective O rings 24 engaged with grooves 31 to 34 are provided between the outside and O rings 24 engaged with grooves 35 to 38. Therefore, respective O rings 24 engaged with grooves 35 to 38 do not need to have solvent resistance in consideration of a solvent included in the external atmosphere, and may be composed of a material having lower hardness and more elastic than those of respective O rings 24 engaged with grooves 35 to 38.

For example, for respective O rings 24 engaged with grooves 35 to 38, a rubber material having a hardness lower than that of perfluoroelastomer, such as fluororubber or nitrile rubber, may be used. On the other hand, since respective O rings 24 engaged with grooves 31 to 34 may be exposed to the external atmosphere, respective O rings 24 engaged with grooves 31 to 34 are preferably composed of a material excellent in solvent resistance such as perfluoroelastomer.

Since respective O rings 24 engaged with grooves 35 to 38 formed at the side close to communication hole portions 25 and respective O rings 24 engaged with grooves 31 to 34 formed at the side far from communication hole portions 25 can be composed of different materials, there can be provided a larger number of options for selecting materials used for O rings 24.

<Squeeze>

The following describes a design for a squeeze of O ring 24. The squeeze refers to a compression distance of O ring 24 when O ring 24 is compressed with O ring 24 being attached to a groove. For example, a squeeze X is expressed by a value obtained by subtracting H from D, where D represents the diameter of the cross section of O ring 24 in a non-compression state and H represents the diameter (for example, H3 shown in FIG. 5) of the cross section of O ring 24 in a compression state.

For the squeeze of O ring 24, a defined value is set in the JIS Standard, the specification of a manufacturer, or the like. For example, when the diameter of the cross section of O ring 24 is D=2 mm, the lower limit of the defined value of the squeeze is set as follows: X=0.3 mm.

Here, in the case of damper ring 150 according to the modification, since respective O rings 24 engaged with grooves 31 to 34 formed at the side far from communication hole portion 25 does not necessarily need to have a sealing property, the squeeze may be smaller than the defined value.

For example, the squeeze may be less than X=0.3 mm. Moreover, the squeeze may be X=0 mm. In this case, O ring 24 engaged with the groove is not compressed and comes into contact with the surface located at the upper side. For example, O ring 24 engaged with first groove 31 is not compressed and comes into contact with inner circumferential surface 5a of cover member 5. Furthermore, the squeeze may be less than X=0 mm, i.e., a negative value. In this case, O ring 24 engaged with the groove is not compressed and does not come into contact with the surface located at the upper side. For example, O ring 24 engaged with first groove 31 is not compressed and does not come into contact with inner circumferential surface 5a of cover member 5.

However, when the squeeze is less than X=0 mm, diameter D of the cross section of O ring 24 is preferably longer than the depth of the groove with which O ring 24 is engaged. In other words, in such a state that O ring 24 is engaged with the groove, O ring 24 preferably at least protrudes from the groove. This is due to the following reason: if O ring 24 does not protrude from the groove, vibration transferred from rotary shaft 1 thereto cannot be sufficiently damped by O ring 24.

As such, when the squeeze of each of respective O rings 24 engaged with grooves 31 to 34 formed at the side far from communication hole portions 25 is set to less than 0.3 mm, which is shorter than the defined value, force of O ring 24 fixing damper ring 150 and bearing portion 2 can be restrained. Therefore, the vibration from rotary shaft 1 can be damped more by elasticity of each of respective O rings 24 engaged with grooves 31 to 34.

<Grooves According to Second Modification>

Figure 12:
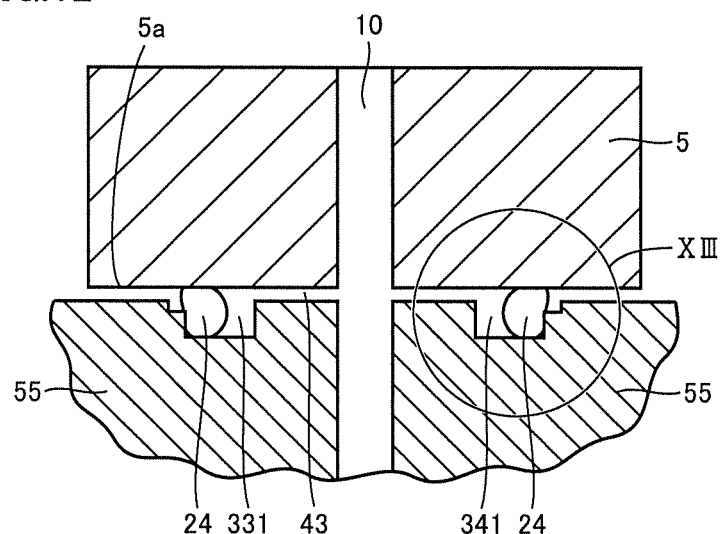
FIG. 12 is a schematic cross sectional view showing a first groove and a second groove provided in an air turbine drive spindle according to a second modification.
Figure 13:
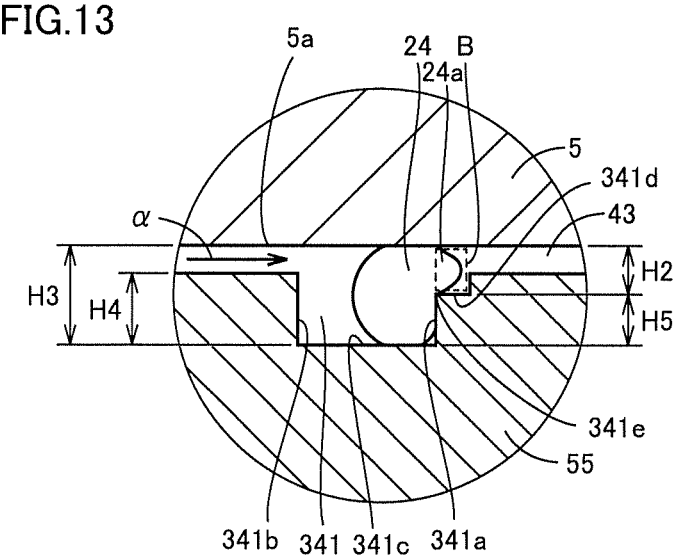
FIG. 13 is an enlarged schematic cross sectional view of the second groove provided in the air turbine drive spindle according to the second modification shown in FIG. 12.

The following describes an air turbine drive spindle according to a second modification with reference to FIG. 12 and FIG. 13. FIG. 12 is a schematic cross sectional view showing a first groove 331 and a second groove 341 provided in the air turbine drive spindle according to the second modification. FIG. 13 is an enlarged schematic cross sectional view of second groove 341 provided in the air turbine drive spindle according to the second modification shown in FIG. 12. It should be noted that second groove 341 will be described here with reference to FIG. 12 and FIG. 13; however, first groove 331 also has the same shape and exhibits the same function and effect. Moreover, third groove 33 and fourth groove 34 may have the same shapes as those of first groove 331 and second groove 341 according to the second modification, and may exhibit the same function and effect. It should be noted that the configurations of the air turbine drive spindle according to the second modification other than the below-described configuration are the same as the configurations of air turbine drive spindle 200 according to the present embodiment.

As shown in FIG. 12 and FIG. 13, second groove 341 includes a first side wall 341a, a second side wall 341b, a bottom portion 341c (bottom surface), and a notch portion 341d. Second groove 341 shown in FIG. 11 and FIG. 12 is different from second groove 34 shown in FIG. 1 and FIG. 2 in that second groove 34 includes chamfered portion 34d, whereas second groove 341 includes notch portion 341d (step portion). Thus, second groove 341 includes notch portion 341d continuous to the upper side of first side wall 341a. By forming this notch portion 341d, height H5 of first side wall 341a becomes lower than height H4 of second side wall 341b. Moreover, by forming notch portion 341d, a top portion 341e is formed. It is assumed that a distance H2 represents a distance from top portion 341e to inner circumferential surface 5a of cover member 5.

Also with such a configuration, there can be formed a space B in which when the bearing gas is supplied to gap 43, one portion 24a of O ring 24 moves in such a state that the surface of one portion 24a is not constrained and one portion 24a has elastic force. Therefore, the air turbine drive spindle according to the second modification exhibits the same effect as that of air turbine drive spindle 200 according to the present embodiment.

<Grooves According to Third Modification>

Figure 14:
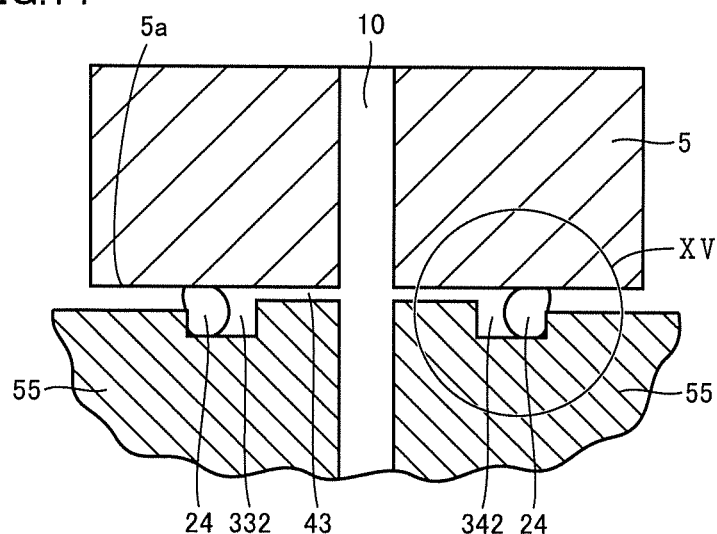
FIG. 14 is a schematic cross sectional view showing a first groove and a second groove provided in an air turbine drive spindle according to a third modification.
Figure 15:
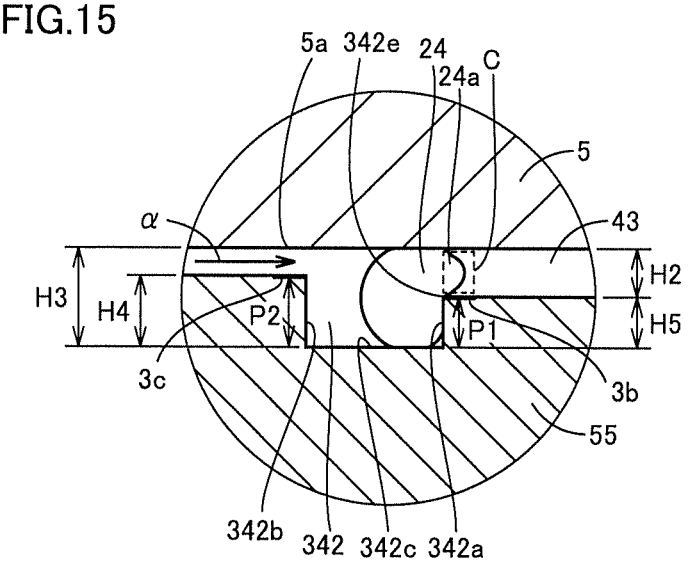
FIG. 15 is an enlarged schematic cross sectional view of the second groove provided in the air turbine drive spindle according to the third modification shown in FIG. 14.

The following describes an air turbine drive spindle according to a third modification with reference to FIG. 14 and FIG. 15. FIG. 14 is a schematic cross sectional view showing a first groove 332 and a second groove 342 provided in the air turbine drive spindle according to the third modification. FIG. 15 is an enlarged schematic cross sectional view of second groove 342 provided in the air turbine drive spindle according to the third modification shown in FIG. 14. It should be noted that second groove 342 will be described here with reference to FIG. 14 and FIG. 15; however, first groove 332 also has the same shape and exhibits the same function and effect. Moreover, third groove 33 and fourth groove 34 may have the same shapes as those of first groove 332 and second groove 342 according to the third modification, and may exhibit the same function and effect. It should be noted that the configurations of the air turbine drive spindle according to the third modification other than the below-described configuration are the same as the configurations of air turbine drive spindle 200 according to the present embodiment.

As shown in FIG. 14 and FIG. 15, second groove 342 includes a first side wall 342a, a second side wall 342b, and a bottom portion 342c (bottom surface). In the description below, it is assumed that a first region 3b represents a region in the vicinity of first side wall 342a in the outer circumferential surface of base portion 55 of damper ring 50, and second region 3c represents a region in the vicinity of second side wall 342b in the outer circumferential surface of base portion 55 of damper ring 50. In the second modification, a minimum distance P1 between first region 3b and bottom portion 342c is shorter than a minimum distance P2 between second region 3c and bottom portion 342c. P1=H5 and P2=H4. Moreover, it is assumed that a distance H2 represents a distance from top portion 342e to inner circumferential surface 5a of cover member 5. Height H5 of first side wall 342a is lower than height H4 of second side wall 342b.

Also with such a configuration, there can be formed a space C in which when the bearing gas is supplied to gap 43, one portion 24a of O ring 24 moves in such a state that the surface of one portion 24a is not constrained and one portion 24a has elastic force. Therefore, the air turbine drive spindle according to the third modification exhibits the same effect as that of air turbine drive spindle 200 according to the present embodiment.

<Grooves according to Fourth Modification>

Figure 16:
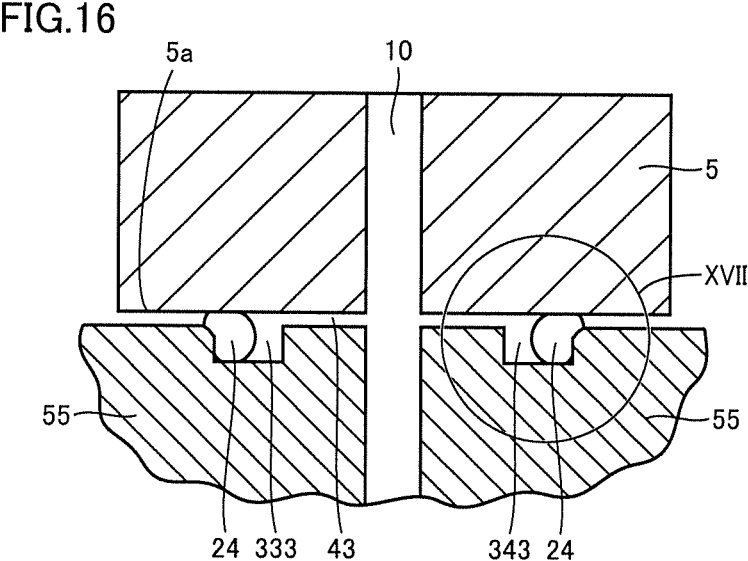
FIG. 16 is a schematic cross sectional view showing a first groove and a second groove provided in an air turbine drive spindle according to a fourth modification.
Figure 17:
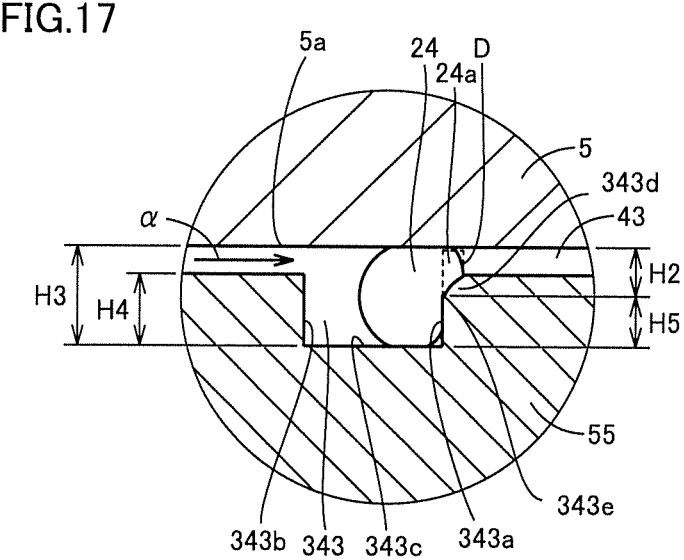
FIG. 17 is an enlarged schematic cross sectional view of the second groove provided in the air turbine drive spindle according to the fourth modification shown in FIG. 16.

The following describes an air turbine drive spindle according to a fourth modification with reference to FIG. 16 and FIG. 17. FIG. 16 is a schematic cross sectional view showing a first groove 333 and a second groove 343 provided in the air turbine drive spindle according to the fourth modification. FIG. 17 is an enlarged schematic cross sectional view of second groove 343 provided in the air turbine drive spindle according to the fourth modification shown in FIG. 16. It should be noted that second groove 343 will be described here with reference to FIG. 16 and FIG. 17; however, first groove 333 also has the same shape and exhibits the same function and effect. Moreover, third groove 33 and fourth groove 34 may have the same shapes as those of first groove 333 and second groove 343 according to the fourth modification, and may exhibit the same function and effect. It should be noted that the configurations of the air turbine drive spindle according to the fourth modification other than the below-described configuration are the same as the configurations of air turbine drive spindle 200 according to the present embodiment.

As shown in FIG. 16 and FIG. 17, second groove 343 includes a first side wall 343a, a second side wall 343b, a bottom portion 343c (bottom surface), and a chamfered portion 343d. Although chamfered portion 34d of the present embodiment is a tapered surface (flat surface), chamfered portion 343d of the third modification has a curved shape as shown in FIG. 16. This chamfered portion 343d preferably has a shape expanding toward outside. By forming chamfered portion 343d, a top portion 343e is formed. It is assumed that a distance H2 represents a distance from top portion 343e to inner circumferential surface 5a of cover member 5.

Also with such a configuration, there can be formed a space D in which when the bearing gas is supplied to gap 43, one portion 24a of O ring 24 moves in such a state that the surface of one portion 24a is not constrained and one portion 24a has elastic force. Therefore, the air turbine drive spindle according to the fourth modification exhibits the same effect as that of air turbine drive spindle 200 according to the present embodiment. It should be noted that chamfered portion 343d may have a shape depressed in the direction of rotary shaft 1.

It should be noted that each of the shapes of the grooves according to the first to third modifications is effective when mainly applied to a groove for sealing, and may be therefore applied to each of the shapes of grooves 35 to 38 formed in damper ring 150 according to the modification. In this case, each of the shapes of the grooves according to the first to third modifications may not be applied to each of the shapes of grooves 31 to 34 formed in damper ring 150 according to the modification.

<As to Range of Distance H2, etc.>

Next, the following describes a preferable range of distance H2 shown in each of FIG. 5, FIG. 13, FIG. 15, and FIG. 17. For example, when air turbine drive spindle 200 is sized to be used for an electrostatic coating apparatus, distance H2 is preferably set as follows: $0.5 \text{ mm} \leq H2 \leq (H3)/2$. By setting the value of distance H2 to fall within such a range, air turbine drive spindle 200 can be operated stably.

Moreover, height H5 of first side wall 32a may be more than or equal to the radius of the cross section of O ring 24. Accordingly, when the bearing gas is supplied from supply device 100, the damping property of air turbine drive spindle 200 can be maintained and O ring 24 can be avoided from being deviated from second groove 32.

<As to Locations in which Grooves are Formed>

In the examples described above, in each of damper rings 50, 150 disposed at the outer circumference side relative to housing 3, the plurality of grooves are formed in which O rings 24 are disposed in a plurality of stages in the radial direction. However, as shown in FIG. 18 and FIG. 19, the plurality of grooves in which O rings 24 are disposed in a plurality of stages in the radial direction may not be necessarily formed in the damper ring.

Figure 18:
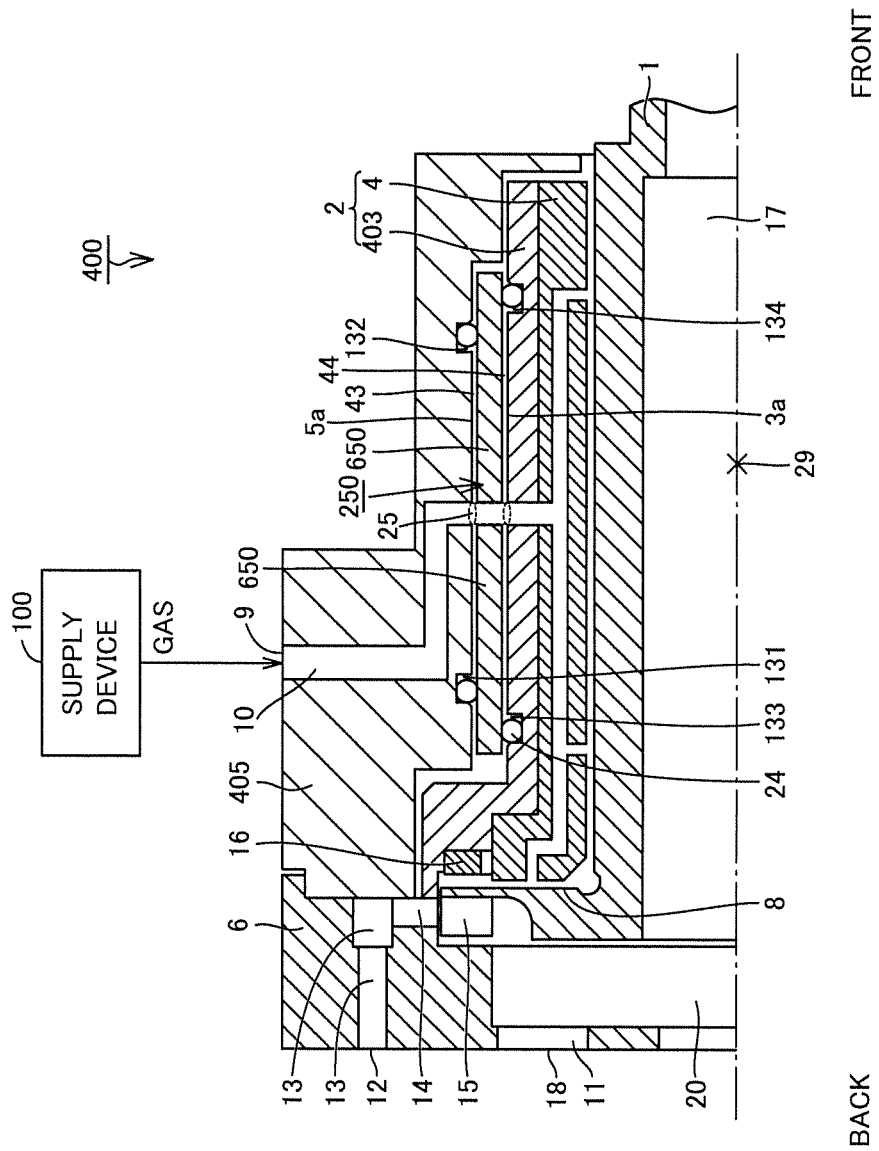
FIG. 18 is a partial schematic cross sectional view in an air turbine drive spindle according to a fifth modification.

FIG. 18 is a partial schematic cross sectional view in an air turbine drive spindle 400 according to a fifth modification. It should be noted that the configurations of air turbine drive spindle 400 according to the fifth modification other than the below-described configuration are the same as the configurations of air turbine drive spindle 200 according to the present embodiment.

As shown in FIG. 18, no groove is formed in a base portion 650 of a damper ring 250. On the other hand, a first groove 131 and a second groove 132 are formed in a surface of a cover member 405 at the damper ring 250 side (inner circumferential side) in the radial direction. Further, a third groove 133 and a fourth groove 134 are formed in a surface of housing 403 at the damper ring 250 side (outer circumferential side) in the radial direction. O rings 24 are respectively engaged with first groove 131, second groove 132, third groove 133, and fourth groove 134.

Figure 19:
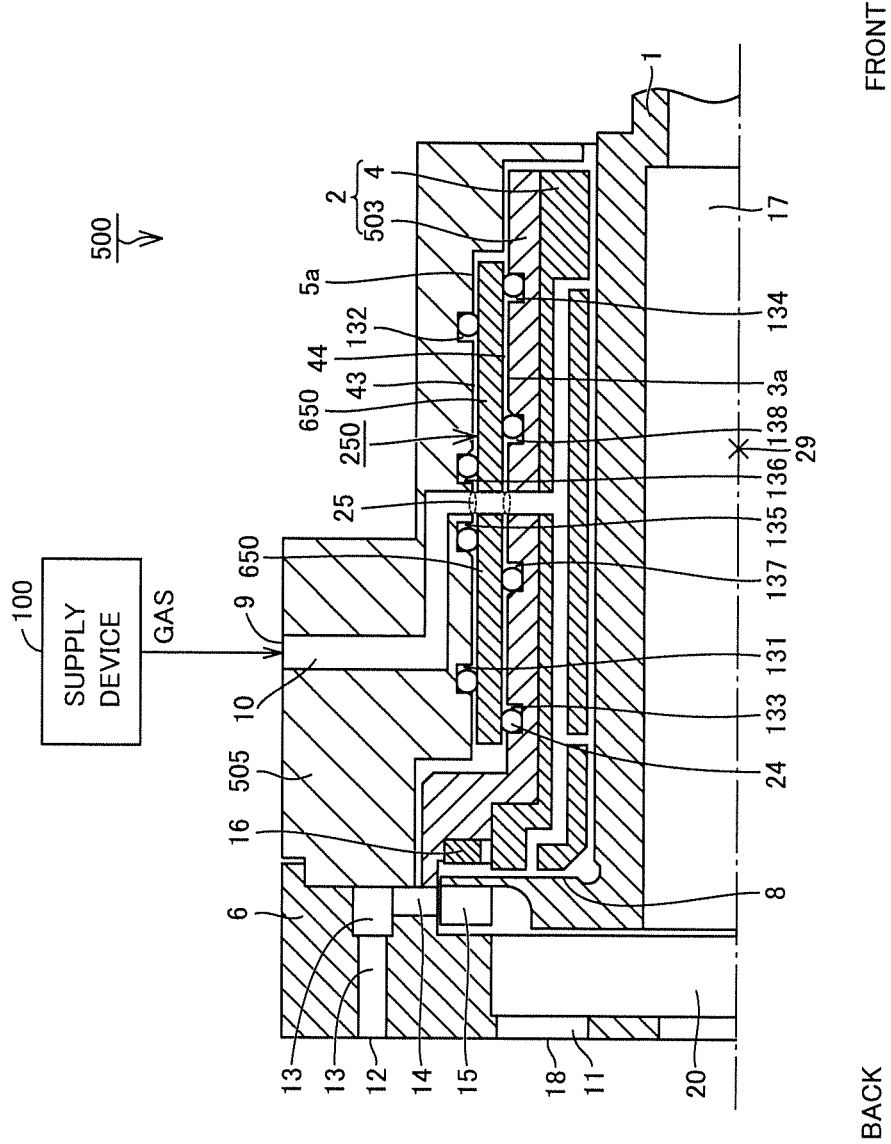
FIG. 19 is a partial schematic cross sectional view in an air turbine drive spindle according to a sixth modification.

FIG. 19 is a partial schematic cross sectional view in an air turbine drive spindle 500 according to a sixth modification. It should be noted that the configurations of air turbine drive spindle 500 according to the sixth modification other than the below-described configuration are the same as the configurations of air turbine drive spindle 200 according to the present embodiment.

As shown in FIG. 19, no groove is formed in a base portion 650 of a damper ring 250. On the other hand, a first groove 131, a second groove 132, a fifth groove 135 and a sixth groove 136 are formed in a surface of a cover member 505 at the damper ring 250 side (inner circumferential side) in the radial direction. Moreover, fifth groove 135 and sixth groove 136 are disposed to sandwich communication hole portion 25 in the thrust direction, and first groove 131 and second groove 132 are disposed to sandwich fifth groove 135 and sixth groove 136 in the thrust direction. O rings 24 for sealing are respectively engaged with fifth groove 135 and sixth groove 136, and O rings 24 for damping are respectively engaged with first groove 131 and second groove 132. Further, a third groove 133, a fourth groove 134, a seventh groove 137, and an eighth groove 138 are formed in a surface of housing 503 at the damper ring 250 side (outer circumferential side) in the radial direction. Moreover, seventh groove 137 and eighth groove 138 are disposed to sandwich communication hole portion 25 in the thrust direction, and third groove 133 and fourth groove 134 are disposed to sandwich seventh groove 137 and eighth groove 138 in the thrust direction. O rings 24 for sealing are respectively engaged with seventh groove 137 and eighth groove 138, and O rings 24 for damping are respectively engaged with third groove 133 and fourth groove 134.

It should be noted that each of first groove 131, second groove 132, third groove 133, fourth groove 134, fifth groove 135, sixth groove 136, seventh groove 137, and eighth groove 138 shown in FIG. 18 and FIG. 19 may have the same shape as that of any one of the grooves according to the present embodiment, the grooves according to the second modification, the grooves according to the third modification, and the grooves according to the fourth modification. For example, second groove 132 may have the same shape as that of any one of second groove 32 according to the present embodiment shown in FIG. 5, second groove 341 according to the second modification shown in FIG. 13, second groove 342 according to the third modification shown in FIG. 15, and second groove 343 according to the fourth modification shown in FIG. 17.

Further, the grooves with which O rings 24 are engaged may be formed in two or more of: the surface of the damper ring at the housing side (inner circumferential side) in the radial direction; the surface of the damper ring at the cover member side (outer circumferential side) in the radial direction; the surface of the housing at the damper ring 250 side (outer circumference side) in the radial direction; and the surface of the cover member at the damper ring side (inner circumferential side) in the radial direction.

Thus, the plurality of grooves in which O rings 24 are disposed in a plurality of stages in the radial direction may be formed in a configuration different from the damper ring (for example, the housing, the cover member, or the like). Also with such a configuration, O rings 24 are disposed in the gap between the outer circumferential surface of the housing and the inner circumferential surface of the damper ring, and are disposed in the gap between the outer circumferential surface of the damper ring and the inner circumferential surface of the cover member.

In the examples described above, the plurality of grooves in which O rings 24 are disposed in the two stages in the radial direction are formed in each of damper rings 50, 150. However, a plurality of grooves in which O rings 24 are disposed in three or more stages in the radial direction may be formed in each of damper rings 50, 150.

For example, in the air turbine drive spindle, a plurality of damper rings may be disposed to overlap with each other in the radial direction. Further, O rings 24 may be disposed in a gap formed between the plurality of damper rings. In this way, the vibration transferred from rotary shaft 1 via bearing portion 2 is first damped by the elasticity of O rings 24 disposed in the gap between housing 3 and the first damper ring, is then damped when being transferred in the first damper ring, is then damped by the elasticity of O rings 24 disposed in the gap between the first damper ring and the second damper ring, is then damped when being transferred in the second damper ring, and is further damped by the elasticity of O rings 24 disposed in the gap between the second damper ring and cover member 5. Accordingly, the rotary shaft can be rotated at a high speed more stably.

Moreover, the first damper ring and the second damper ring may be constructed in one piece as one member. For example, a plurality of damper rings may be constructed in one piece as one member such as a cantilever, and O rings may be disposed in a gap between the damper rings.

<As to Cuts>

In the examples described above, cuts 53, 54 are formed in both the end portions of damper ring 150 in the thrust direction. However, a cut may be formed only in one end portion of the damper ring in the thrust direction. Alternatively, no cut may be formed. It should be noted that cuts 53, 54 are preferably formed in both the end portions of the damper ring in the thrust direction in view of such a fact that the amount of deformation of the damper ring with respect to the external force can be increased.

Although the embodiments of the present invention have been illustrated, the embodiments described above can be modified in various manners. Further, the scope of the present invention is not limited to the above-described embodiments. The scope of the present invention is defined by the terms of the claims, and is intended to include any modifications within the scope and meaning equivalent to the terms of the claims.

INDUSTRIAL APPLICABILITY

The present invention is particularly advantageously applied to an air turbine drive spindle used for an electrostatic coating apparatus or the like.

REFERENCE SIGNS LIST

1: rotary shaft; 2: bearing portion; 3: housing; 4: bearing sleeve; 5: cover member; 6: nozzle plate; 7: journal bearing; 8: thrust bearing; 9: supply port; 10: bearing gas supply passage; 11: gas exhaust hole; 12: driving gas supply port; 13: driving gas supply passage; 14: driving gas supply nozzle; 15: rotor blade; 16: magnet; 17: through hole; 18: rotation sensor insertion port; 20: gas exhaust space; 24: O ring; 25: communication hole portion; 31: first groove; 32: second groove; 33: third groove; 34: fourth groove; 50: damper ring; 53, 54: cut; 55: base portion; 56: hole; 80: cup; 100: supply device.

The invention claimed is:

1. An air turbine drive spindle comprising:
a rotary shaft;
a bearing portion configured to surround at least a portion of an outer circumferential surface of the rotary shaft;
a support member disposed at an outer circumferential side relative to the bearing portion with a first gap being interposed between the support member and the bearing portion;
a cover member disposed at the outer circumferential side relative to the support member with a second gap being interposed between the cover member and the support member, the cover member being configured to store the rotary shaft, the bearing portion, and the support member; and
at least one or more O rings disposed in each of the first gap and the second gap.

2. The air turbine drive spindle according to claim 1, wherein at least one of the bearing portion, the support member, and the cover member has a surface that faces the first gap or the second gap and that is provided with at least one or more grooves with which the O rings are engaged.

3. The air turbine drive spindle according to claim 1, wherein the bearing portion includes a bearing member disposed at the rotary shaft side, and a housing member disposed at the support member side.

4. The air turbine drive spindle according to claim 1, wherein
a communication hole portion continuous to the first gap and the second gap is formed in at least one of the cover member and the support member,
the air turbine drive spindle further comprising a supply device configured to supply gas to the communication hole portion, wherein
the one or more O rings include a plurality of O rings for sealing, the plurality of O rings for sealing being disposed in the first gap and the second gap so as to sandwich the communication hole portion in a thrust direction of the rotary shaft.

5. The air turbine drive spindle according to claim 4, wherein the one or more O rings include a plurality of O rings for damping, the plurality of O rings for damping being disposed so as to sandwich the plurality of O rings for sealing in the thrust direction of the rotary shaft.

6. The air turbine drive spindle according to claim 5, wherein each of the plurality of O rings for sealing is composed of a material different from a material of each of the plurality of O rings for damping.

7. The air turbine drive spindle according to claim 5, wherein each of the plurality of O rings for damping has a squeeze of less than 0.3 mm.

8. The air turbine drive spindle according to claim 1, wherein a material of the support member includes a metal.

9. The air turbine drive spindle according to claim 1, wherein a material of the support member includes a resin.

10. The air turbine drive spindle according to claim 1, wherein
the support member is an annular member formed to surround the bearing portion, and
a cut is formed in an end portion of the support member in the thrust direction of the rotary shaft.

* * * * *